US008962135B2

(12) United States Patent
Inoue et al.

(10) Patent No.: US 8,962,135 B2
(45) Date of Patent: *Feb. 24, 2015

(54) PRESSURE-SENSITIVE ADHESIVE COMPOSITION FOR OPTICAL FILM, PRESSURE-SENSITIVE ADHESIVE LAYER FOR OPTICAL FILM, PRODUCTION METHOD THEREOF, PRESSURE-SENSITIVE ADHESIVE OPTICAL FILM AND IMAGE DISPLAY

(75) Inventors: Shinichi Inoue, Ibaraki (JP); Yuusuke Toyama, Ibaraki (JP); Mizue Nagata, Ibaraki (JP); Toshitsugu Hosokawa, Ibaraki (JP); Yutaka Moroishi, Ibaraki (JE); Fumiko Nakano, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 813 days.

This patent is subject to a terminal disclaimer.

(21) Appl. No.: 12/255,440

(22) Filed: Oct. 21, 2008

(65) Prior Publication Data
US 2009/0104450 A1 Apr. 23, 2009

(30) Foreign Application Priority Data

Oct. 22, 2007 (JP) ................. 2007-274063
Jun. 13, 2008 (JP) ................. 2008-155779

(51) Int. Cl.
*B32B 7/12* (2006.01)
*C09J 7/02* (2006.01)
*C09J 133/14* (2006.01)

(52) U.S. Cl.
CPC .............. *C09J 7/0217* (2013.01); *C09J 133/14* (2013.01); *G02F 2202/28* (2013.01)
USPC ................. 428/355 AC; 428/355 N; 528/332; 528/75; 528/24; 525/342

(58) Field of Classification Search
USPC ........... 428/355 AC, 355 N; 528/332, 75, 24; 525/342
See application file for complete search history.

(56) References Cited

U.S. PATENT DOCUMENTS

| 5,278,271 | A | 1/1994 | Miyajima et al. |
| 5,389,437 | A | 2/1995 | Miyajima et al. |
| 6,020,408 | A * | 2/2000 | Suzuki et al. ................. 524/265 |
| 6,451,156 | B2 | 9/2002 | Kishioka et al. |
| 6,599,967 | B2 | 7/2003 | Kishioka et al. |
| 7,435,779 | B2 | 10/2008 | Toyama et al. |
| 7,846,542 | B2 * | 12/2010 | Toyama et al. ......... 428/355 AC |
| 7,862,888 | B2 * | 1/2011 | Toyama et al. ............... 428/354 |
| 2003/0200764 | A1 | 10/2003 | Takeuchi et al. |
| 2005/0038152 | A1 * | 2/2005 | Naito et al. ................... 524/270 |
| 2005/0277729 | A1 | 12/2005 | Tsunemine et al. |
| 2006/0088670 | A1 | 4/2006 | Kim et al. |
| 2006/0121273 | A1 | 6/2006 | Toyama et al. |
| 2006/0159915 | A1 | 7/2006 | Chang et al. |
| 2006/0223938 | A1 | 10/2006 | Nagamoto et al. |
| 2006/0234074 | A1 | 10/2006 | Yun et al. |
| 2007/0141288 | A1 | 6/2007 | Hongo et al. |
| 2007/0191517 | A1 | 8/2007 | Chun et al. |
| 2007/0196646 | A1 | 8/2007 | Matano et al. |
| 2008/0118752 | A1 * | 5/2008 | Inoue et al. .................... 428/354 |
| 2008/0277054 | A2 | 11/2008 | Jun et al. |
| 2009/0022925 | A1 * | 1/2009 | Yamanaka et al. ........... 428/41.3 |
| 2009/0023869 | A1 * | 1/2009 | Shirafuji et al. .............. 525/451 |
| 2009/0042004 | A1 * | 2/2009 | Yano et al. .................... 428/220 |
| 2009/0087650 | A1 | 4/2009 | Inoue et al. |
| 2009/0233093 | A1 | 9/2009 | Toyama et al. |
| 2009/0258224 | A1 | 10/2009 | Kawabe et al. |
| 2009/0270557 | A1 | 10/2009 | Tomita et al. |
| 2011/0070435 | A1 | 3/2011 | Toyama et al. |

FOREIGN PATENT DOCUMENTS

| EP | 1852484 A1 | 11/2007 |
| EP | 1 956 064 A1 | 8/2008 |
| JP | 50-107032 A | 8/1975 |
| JP | 62-023287 B2 | 5/1987 |
| JP | 2-3481 A | 1/1990 |
| JP | 2-292382 A | 12/1990 |
| JP | 4-372682 A | 12/1992 |
| JP | 6-108025 A | 4/1994 |
| JP | 2003-013027 A | 1/2003 |
| JP | 2003-193012 A | 7/2003 |
| JP | 2003-320837 A | 11/2003 |

(Continued)

OTHER PUBLICATIONS

Korean Office Action dated Nov. 26, 2010, issued in corresponding Korean Patent Application No. 10-2008-0103240.
European Search Report dated Jan. 19, 2009, issued in corresponding European Patent Application No. 08018391.6.
Taiwanese Office Action dated May 2, 2012, issued in corresponding Taiwanese Patent Application No. 097140469, w/ English translation.
Taiwanese Office Action dated Jun. 21, 2012, Taiwanese Patent Application No. 098107458, with English translation (9 pages).
Taiwanese Office Action dated Jun. 21, 2012, Taiwanese Patent Application No. 098104104, with English translation (9 pages).
Chinese Office Action dated Nov. 2, 2011, issued in corresponding Chinese Patent Application No. 2008-10185222.X.
Chinese Office Action dated Jul. 13, 2011, issued in corresponding Chinese Patent Application No. 200810185222.
Translation of JP2003-013027, Jan. 15, 2003.

(Continued)

*Primary Examiner* — Hai Vo
(74) *Attorney, Agent, or Firm* — Westerman, Hattori, Daniels & Adrian, LLP

(57) ABSTRACT

A pressure-sensitive adhesive composition for an optical film of the present invention comprises 100 parts by weight of a (meth)acrylic polymer comprising 45 to 99.99% by weight of an alkyl (meth)acrylate monomer unit and 0.01 to 2% by weight of a tertiary amino group-containing monomer unit; and 0.01 to 2 parts by weight of a peroxide as a crosslinking agent. The pressure-sensitive adhesive composition can form an pressure-sensitive adhesive layer that has satisfactory reworkability such that optical films can be easily peeled from liquid crystal panels with no adhesive residue and also has satisfactory processability such that it can be worked without pressure-sensitive adhesive fouling or dropout.

4 Claims, No Drawings

(56) References Cited

FOREIGN PATENT DOCUMENTS

| | | | |
|---|---|---|---|
| JP | 2003-329837 A | 11/2003 |
| JP | 2003-329838 A | 11/2003 |
| JP | 2004-91499 A | 3/2004 |
| JP | 2004-91500 A | 3/2004 |
| JP | 3533589 B2 | 5/2004 |
| JP | 3594206 B2 | 11/2004 |
| JP | 2005-053976 A | 3/2005 |
| JP | 2006-143858 A | 6/2006 |
| JP | 2006-183022 A | 7/2006 |
| JP | 2007-138056 A | 6/2007 |
| JP | 2007-138057 A | 6/2007 |
| JP | 2007-138147 A | 6/2007 |
| JP | 2007-169329 A | 7/2007 |
| JP | 2007-277510 A | 10/2007 |
| JP | 2007-320983 A | 12/2007 |
| JP | 2008-045048 A | 2/2008 |
| JP | 2009-242767 A | 10/2009 |
| KR | 2006-00067404 A | 6/2006 |
| KR | 2006-0067405 A | 6/2006 |
| KR | 10-2006-0108515 A | 10/2006 |
| KR | 2006 0106721 A | 10/2006 |
| TW | 200728423 A | 8/2007 |
| WO | 2007-046365 A1 | 4/2007 |
| WO | 2007-046396 | 4/2007 |
| WO | 2007-058277 A1 | 5/2007 |

OTHER PUBLICATIONS

Korean Office Action dated Oct. 31, 2011, issued in corresponding Korean Patent Application No. 10-2009-0017839, with English Translation.
Taiwanese Office Action dated Aug. 29, 2012, issued in corresponding application No. 097148805, with English translation.
Chinese Office Action dated Apr. 8, 2011, issued in corresponding Chinese Patent Application No. 200810185222.
Korean Office Action dated Dec. 29, 2010, issued in corresponding Korean Patent Application No. 2008-129040.
European Search Report dated Jun. 29, 2009, issued in corresponding European Patent Application No. 08021832.4.
Korean Office Action dated Dec. 29, 2010, issued in corresponding Korean Patent Application No. 2008-129254.
Taiwanese Office Action dated Nov. 7, 2012, issued in corresponding Taiwanese Patent Application No. 098107458, with English translation.
Japanese Office Action dated Nov. 9, 2012, issued in corresponding Japanese Patent Application No. 2008-155779 (w/Partial Translation).
Japanese Office Action dated Nov. 9, 2012, issued in Japanese Patent Application No. 2008-153294 (w/Partial Translation).
Japanese Office Action dated Nov. 9, 2012, issued in Japanese Patent Application No. 2008-150722 (w/Partial Translation).
Taiwanese Office Action dated Dec. 4, 2012, issued in corresponding Taiwanese Patent Application No. 097140469, with partial English Translation.
JP2004-091499 Machine translation and English abstract (13 pages).
Decision of The Intellectual Property Office dated Jun. 19, 2013, issued in Taiwanese Patent Application No. 097148805, with English translation.
U.S. Non-Final Office Action dated Oct. 2, 2013, issued in related U.S Appl. No. 12/338,435 (43 pages).
U.S. Final Office Action dated Oct. 9, 2013, issued in related U.S. Appl. No. 12/916,959 (13 pages).
U.S. Office Action dated Dec. 4, 2013, issued in corresponding U.S. Appl. No. 12/954,102.
U.S. Office Action dated Apr. 25, 2014, issued in U.S. Appl. No. 12/338,435 (22 pages).
U.S. Non-Final Office Action dated Aug. 20, 2013 issued in related U.S. Appl. No. 12/954,102.
Non-Final Office Action dated Jun. 26, 2013, issued in corresponding U.S. Appl. No. 12/916,959.

\* cited by examiner

PRESSURE-SENSITIVE ADHESIVE COMPOSITION FOR OPTICAL FILM, PRESSURE-SENSITIVE ADHESIVE LAYER FOR OPTICAL FILM, PRODUCTION METHOD THEREOF, PRESSURE-SENSITIVE ADHESIVE OPTICAL FILM AND IMAGE DISPLAY

BACKGROUND OF THE INVENTION

1. Field of the Invention

The present invention relates to a pressure-sensitive adhesive composition required to be transparent for an optical film, a pressure-sensitive adhesive layer formed from the pressure-sensitive adhesive composition for an optical film and a production method thereof. The present invention also relates to a pressure-sensitive adhesive optical film including an optical film and the pressure-sensitive adhesive layer formed on at least one side of the optical film. The present invention further relates to an image display such as a liquid crystal display and an organic electroluminescence (EL) display, including the pressure-sensitive adhesive optical film. The optical film may be a polarizing plate, a retardation plate, an optical compensation film, a brightness enhancement film, a laminate thereof, or the like.

2. Description of the Related Art

The image-forming system of liquid crystal displays or the like requires polarizing elements to be placed on both sides of a liquid crystal cell, and generally polarizing plates are attached thereto. Besides polarizing plates, a variety of optical elements have been used for liquid crystal panels to improve display quality. For example, there are used retardation plates for prevention of discoloration, viewing angle expansion films for improvement of the viewing angle of liquid crystal displays, and brightness enhancement films for enhancement of the contrast of displays. These films are generically called optical films.

When the optical films are attached to a liquid crystal cell, pressure-sensitive adhesives are generally used. Bonding between an optical film and a liquid crystal cell or between optical films is generally performed with a pressure-sensitive adhesive in order to reduce optical loss. In such a case, a pressure-sensitive adhesive optical film including an optical film and a pressure-sensitive adhesive layer previously formed on one side of the optical film is generally used, because it has some advantages such as no need for a drying process to fix the optical film. In general, a separator (a release film) is also attached to the pressure-sensitive adhesive layer.

The pressure-sensitive adhesive is required to have some characteristics. In some cases, for example, if in the process of bonding an optical film to a liquid crystal cell, they are misaligned or foreign matter is caught on the bonding surface, the optical film should be separated from the liquid crystal panel such that the liquid crystal cell can be recycled, and the pressure-sensitive adhesive should have re-peelability (re-workability) such that the optical film can be easily peeled from the liquid crystal panel with no adhesive residue in a peeling process. Particularly in recent years, thin liquid crystal panels having chemically-etched glass plates are frequently used together with conventional panel manufacturing processes, and it has become difficult to subject optical films from the thin liquid crystal panels to reworking or working processes.

In general, the optical pressure-sensitive adhesive is applied to an optical film to form a pressure-sensitive adhesive layer, and then the optical film is wound into a roll and subjected to a punching process. The optical pressure-sensitive adhesive generally includes an acrylic polymer as a base polymer and a crosslinking agent. For example, the crosslinking agent includes an isocyanate compound. When an isocyanate compound is used, however, it takes a long time to form the pressure-sensitive adhesive layer (for aging), and a long time is required until shipment. If a working process is performed without the aging, fouling such as pressure-sensitive adhesive fouling and dropout fouling will occur to degrade workability. In addition, defects such as dents may be generated during the aging. Therefore, the optical pressure-sensitive adhesive is required to have workability such that it can be worked without pressure-sensitive adhesive fouling or dropout.

It is proposed that peroxide should be used as a crosslinking agent for optical pressure-sensitive adhesives. Crosslinking with peroxide can be completed by a curing process after dying and therefore has the advantage of no need for aging time. When peroxide is used, however, peeling strength for separators can significantly increase so that it can be laborious for panel makers to peel off separators (release films), which can cause some problems such as manufacturing line stoppages. In recent years, as optical films become thinner, peelability or releasability easier than that of conventional separators and better workability are also required.

In addition, the pressure-sensitive adhesive is required not to cause any defect in durability tests by heating, moistening and so on, which are generally performed as accelerated environmental tests.

A conventionally proposed method for solving the problems with the reworkability of liquid crystal panels includes adding a plasticizer or an oligomer component to an acrylic polymer used as a base polymer for an acrylic pressure-sensitive adhesive (see Patent Literature 1 listed below). However, such an acrylic pressure-sensitive adhesive cannot provide satisfactory reworkability for the thin liquid crystal panels as mentioned above, satisfactory processability for pressure-sensitive adhesive optical films or satisfactory workability for separators.

Other proposals include an acrylic pressure-sensitive adhesive including an acrylic polymer to which a peroxide is added (see Patent Literature 2), the use of alkyl (meth)acrylate, a monomer having a hydroxyl group in the molecule and a monomer having a functional group such as a carboxyl, amide or amino group in the molecule as monomer components to form an acrylic polymer (see Patent Literatures 3 and 4), and the use of alkyl (meth)acrylate and a nitrogen-containing monomer such as an imide group-containing monomer or an amide group-containing monomer as monomer components to form an acrylic polymer and the use of a peroxide and an isocyanate compound (see Patent Literature 5). However, none of these acrylic pressure-sensitive adhesives disclosed in the patent literatures can provide satisfactory long-term durability or reworkability, or sufficient processability for pressure-sensitive adhesive optical films or sufficient workability for separators, although they can provide improved initial durability.

Patent Literature 1: JP-A No. 2003-329837
Patent Literature 2: JP-A No. 2006-183022
Patent Literature 3: JP-A No. 2004-091499
Patent Literature 4: JP-A No. 2004-091500
Patent Literature 5: JP-A No. 2007-138147

SUMMARY OF THE INVENTION

An object of the present invention is to provide a pressure-sensitive adhesive composition for an optical film capable of forming an pressure-sensitive adhesive layer that has satisfactory reworkability such that optical films can be easily peeled from liquid crystal panels with no adhesive residue and also has satisfactory processability such that it can be worked without pressure-sensitive adhesive fouling or dropout, after it is formed on an optical film. Another object of the present invention is to provide a pressure-sensitive adhesive composition for an optical film capable of forming a pressure-sensitive adhesive layer having easy peelability or releasability from separators and having good workability.

A further object of the present invention is to provide a pressure-sensitive adhesive layer formed from the pressure-sensitive adhesive composition for an optical film and to provide a production method thereof. A further object of the present invention is to provide a pressure-sensitive adhesive optical film comprising such a pressure-sensitive adhesive layer and to provide an image display including such a pressure-sensitive adhesive optical film.

As a result of investigations for solving the problems, the inventors have found the pressure-sensitive adhesive composition for an optical film described below and have completed the present invention.

The present invention related to a pressure-sensitive adhesive composition for an optical film, comprising:

100 parts by weight of a (meth)acrylic polymer comprising 45 to 99.99% by weight of an alkyl(meth)acrylate monomer unit and 0.01 to 2% by weight of a tertiary amino group-containing monomer unit; and 0.01 to 2 parts by weight of a peroxide as a crosslinking agent.

The pressure-sensitive adhesive composition for an optical film preferably further comprises 0.01 to 2 parts by weight of an isocyanate crosslinking agent as another crosslinking agent, based on 100 parts by weight of the (meth)acrylic polymer.

The pressure-sensitive adhesive composition for an optical film preferably further comprises 0.01 to 2 parts by weight of a silane coupling agent, based on 100 parts by weight of the (meth)acrylic polymer.

In the pressure-sensitive adhesive composition for an optical film, the (meth)acrylic polymer preferably further comprises 0.01 to 5% by weight of a carboxyl group-containing monomer unit and/or 0.01 to 5% by weight of a hydroxyl group-containing monomer unit.

In the pressure-sensitive adhesive composition for an optical film, the tertiary amino group-containing monomer is preferably N,N-dimethylaminoethyl(meth)acrylate and/or N,N-dimethylaminopropyl(meth)acrylamide.

In the pressure-sensitive adhesive composition for an optical film, the (meth)acrylic polymer preferably has a weight average molecular weight of 1,000,000 to 3,000,000.

The present invention also related to a pressure-sensitive adhesive layer for an optical film, comprising a product formed from the pressure-sensitive adhesive composition for an optical film.

The pressure-sensitive adhesive layer for an optical film preferably has a gel fraction of 50 to 95% by weight.

The present invention also related to a method for producing the pressure-sensitive adhesive layer for an optical film, comprising:

applying the pressure-sensitive adhesive composition for an optical film to a base material; and curing the composition at a temperature of 70 to 160° C. for a time period of 30 to 240 seconds.

The present invention also related to a pressure-sensitive adhesive optical film, comprising an optical film; and the pressure-sensitive adhesive layer for an optical film formed on at least one side of the optical film.

The present invention also related to an image display, comprising at least one piece of the pressure-sensitive adhesive optical film.

The pressure-sensitive adhesive composition for an optical film of the present invention includes a (meth)acrylic polymer as a base polymer that contains a tertiary amino group-containing monomer unit in a small amount of 0.01 to 2% by weight. The pressure-sensitive adhesive composition for an optical film having this feature can improve processability and reworkability and prevent pressure-sensitive adhesive fouling or dropout during working processes and also allows easy peeling with no adhesive residue in the process of peeling optical films from thin liquid crystal panels, especially from liquid crystal panels using chemically-etched glass plates. The pressure-sensitive adhesive layer can also be separated from liquid crystal panels without destruction of optical films, so that thin liquid crystal panels can be prevented from being damaged, which allows effective recycling of liquid crystal panels.

A small amount of the tertiary amino group-containing monomer unit contained in the (meth)acrylic polymer is considered to improve the crosslink stability of the pressure-sensitive adhesive layer, after the pressure-sensitive adhesive layer is formed by a crosslinking reaction with a crosslinking agent. When a peroxide is used in the specified amount as a crosslinking agent, the crosslink stability produced with the tertiary amino group-containing monomer can be particularly improved. In addition to the peroxide, an isocyanate compound is also preferably used as a crosslinking agent. Additionally, a silane coupling agent may be used within the specified range. When the peroxide is used in combination with an isocyanate compound and/or a silane coupling agent, the crosslink stability, the reworkability and the processability can be particularly improved. When pressure-sensitive adhesive layers are formed from conventional pressure-sensitive adhesive compositions containing an additive such as a silane coupling agent, it is difficult to stably maintain the characteristics of the pressure-sensitive adhesive layer, because the silane coupling agent or the like can volatilize from the pressure-sensitive adhesive layer over time. The pressure-sensitive adhesive composition of the present invention can provide an increased level of the remaining silane coupling agent in the pressure-sensitive adhesive layer for a long time so that product characteristics can be more stable and that long-term durability can be achieved.

A carboxyl group-containing monomer unit or a hydroxyl group-containing monomer unit optionally contained in the (meth)acrylic polymer can further improve the durability and the reworkability. It is considered that in the (meth)acrylic polymer containing a carboxyl group-containing monomer unit or a hydroxyl group-containing monomer unit as a copolymerized component, acid-base interaction or hydrogen bonding is induced by the copolymerized component to improve the reworkability and the durability so that defects such as separation and peeling of the pressure-sensitive adhesive can be prevented under heating or moistening conditions.

The pressure-sensitive adhesive composition of the present invention including the tertiary amino group incorporated in the (meth)acrylic polymer and the peroxide crosslinking agent can form a pressure-sensitive adhesive layer with a high level of productivity and workability, which is an advantage derived from peroxide crosslinking, and can prevent an increase in peeling strength for separators (release films). Therefore, the pressure-sensitive adhesive layer allows easy peeling from separators at any time, which can further improve workability and production efficiency. It is considered that a combination of the tertiary amino group-containing (meth)acrylic polymer and the peroxide provides a high decomposition rate and allows a crosslinking reaction between the (meth)acrylic polymer molecules to occur preferentially to that between a separator and the (meth)acrylic polymer so that an increase in peeling strength for the separator can be prevented.

DETAILED DESCRIPTION OF THE PREFERRED EMBODIMENTS

A pressure-sensitive adhesive composition for an optical film of the present invention comprises a (meth)acrylic polymer, as base polymer, comprising 45 to 99.99% by weight of an alkyl(meth)acrylate monomer unit and 0.01 to 2% by weight of a tertiary amino group-containing monomer unit.

The alkyl group of the alkyl(meth)acrylate may have about 2 to about 18 carbon atoms. The alkyl group may be a straight or branched chain. The alkyl group preferably has an average carbon atom number of 2 to 14, more preferably of 3 to 12, even more preferably of 4 to 9. As used herein, "(meth)acrylate" refers to acrylate and/or methacrylate, and "meth" has the same meaning with respect to the present invention.

Examples of the alkyl(meth)acrylate include ethyl(meth)acrylate, n-butyl(meth)acrylate, sec-butyl(meth)acrylate, tert-butyl(meth)acrylate, isobutyl(meth)acrylate, n-pentyl(meth)acrylate, isopentyl(meth)acrylate, hexyl(meth)acrylate, heptyl(meth)acrylate, isoamyl(meth)acrylate, 2-ethylhexyl(meth)acrylate, n-octyl(meth)acrylate, isooctyl(meth)acrylate, n-nonyl(meth)acrylate, isononyl(meth)acrylate, n-decyl(meth)acrylate, isodecyl(meth)acrylate, n-dodecyl(meth)acrylate, isomyristyl(meth)acrylate, n-tridecyl(meth)acrylate, n-tetradecyl(meth)acrylate, stearyl(meth)acrylate, isostearyl(meth)acrylate, and phenoxyethyl(meth)acrylate. In particular, n-butyl(meth)acrylate and 2-ethylhexyl(meth)acrylate or the like are preferably used, and the alkyl(meth)acrylate may be used alone or in combination.

In the present invention, the amount of the alkyl(meth)acrylate is from 45 to 99.99% by weight, preferably from 85 to 99.99% by weight, more preferably from 87 to 99.99% by weight, even more preferably from 90 to 99.99% by weight, still more preferably from 98 to 99.99% by weight, based on the amount of all the monomer components for the (meth)acrylic polymer. If the amount of the (meth)acrylic monomer is too small, the adhesion can be undesirably reduced.

The tertiary amino group-containing monomer may be a monomer having a tertiary amino group and a (meth)acryloyl group. The tertiary amino group is preferably a tertiary aminoalkyl group. Examples of the tertiary amino group-containing monomer include N,N-dialkylaminoalkyl(meth)acrylamide and N,N-dialkylaminoalkyl(meth)acrylate. Specific examples of the tertiary amino group-containing monomer include N,N-dimethylaminoethyl(meth)acrylamide, N,N-dimethylaminopropyl(meth)acrylamide, N,N-diethylaminoethyl(meth)acrylamide, N,N-diethylaminopropyl(meth)acrylamide, N,N-dimethylaminoethyl(meth)acrylate, N,N-dimethylaminopropyl(meth)acrylate, N,N-diethylaminoethyl(meth)acrylate, and N,N-diethylaminopropyl(meth)acrylamide. Among these tertiary amino group-containing monomers, N,N-dimethylaminoethyl(meth)acrylate and/or N,N-dimethylaminopropyl(meth)acrylamide are particularly preferred.

It is difficult to improve reworkability or processability, when the tertiary amino group-containing monomer is replaced by any other type of monomer, such as a maleimide monomer such as maleimide, N-cyclohexylmaleimide or N-phenylmaleimide; a succinimide monomer such as N-(meth)acryloyloxymethylenesuccinimide, N-(meth)acryloyl-6-oxyhexamethylenesuccinimide or N-(meth)acryloyl-8-oxyoctamethylenesuccinimide; an N-substituted amide monomers such as (meth)acrylamide, N,N-dimethyl(meth)acrylamide, N,N-diethyl(meth)acrylamide, N-isopropyl(meth)acrylamide, N-methylol(meth)acrylamide, N-methoxymethyl(meth)acrylamide, or N-butoxymethyl(meth)acrylamide; a secondary amino group-containing monomer such as tert-butylaminoethyl(meth)acrylate; diacetone(meth)acrylamide, N-vinylacetamide, N,N'-methylenebis(meth)acrylamide, N-vinylcaprolactam, N-acryloylmorpholine, N-acryloylpiperidine, N-methacryloylpiperidine, or N-acryloylpyrrolidine, even though such a monomer is a nitrogen-containing monomer.

The tertiary amino group-containing monomer is used in an amount of 0.01 to 2% by weight, based on the total amount of the monomer components used to form the (meth)acrylic polymer. The amount of the tertiary amino group-containing monomer is preferably from 0.01 to 1.5% by weight, more preferably from 0.01 to 1% by weight, even more preferably from 0.01 to 0.5% by weight, still more preferably from 0.05 to 0.45% by weight, yet more preferably from 0.05 to 0.2% by weight. If the amount of the tertiary amino group-containing monomer is less than 0.01% by weight, the crosslink stability of the pressure-sensitive adhesive layer can be poor, and reworkability or processability can be unsatisfactory. Such a small amount is also not preferred in view of durability. In such a small amount, crosslinking cannot sufficiently proceed so that it can be difficult to reduce the gel fraction of the pressure-sensitive adhesive layer and that the releasability from the separator can be high, which is not preferred. In view of reworkability and durability, too high content of the tertiary amino group-containing monomer is not preferred, and the content is controlled to be 2% by weight or less such that the cohesion of the pressure-sensitive adhesive layer will not be too high.

Besides the monomers described above, monomer components that may be used to form the (meth)acrylic polymer preferably include a carboxyl group-containing monomer and/or a hydroxyl group-containing monomer in terms of improving durability and so on. In particular, a hydroxyl group-containing monomer is preferably used.

As a carboxyl group-containing monomer, those having a carboxyl group and an unsaturated double bond-containing polymerizable functional group such as a (meth)acryloyl group or a vinyl group may be used without any particular limitations. Examples of the carboxyl group-containing monomer include acrylic acid, methacrylic acid, carboxyethyl(meth)acrylate, carboxypentyl(meth)acrylate, itaconic acid, maleic acid, fumaric acid, and crotonic acid. In particular, acrylic acid and methacrylic acid are preferably used.

The carboxyl group-containing monomer may be used in an amount of 0.01 to 5% by weight, based on the total amount of the monomer components used to form the (meth)acrylic polymer. The amount of the carboxyl group-containing monomer is preferably from 0.01 to 2% by weight, more preferably from 0.01 to 1% by weight, even more preferably from 0.05 to 0.5% by weight. In order to improve the durability, the carboxyl group-containing monomer is preferably added in an amount of 0.01% by weight or more. On the other hand, if the amount of the carboxyl group-containing monomer is more than 5% by weight, the adhesive strength can be undesirably high so that the releasability can be poor and that the reworkability requirements cannot be satisfied.

As a hydroxyl group-containing monomer, those having a hydroxyl group and an unsaturated double bond-containing polymerizable functional group such as a (meth)acryloyl group or a vinyl group may be used without any particular limitations. Examples of the hydroxyl group-containing monomer include hydroxyalkyl(meth)acrylates such as 2-hydroxyethyl(meth)acrylate, 2-hydroxybutyl(meth)acrylate, 3-hydroxypropyl(meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, and 12-hydroxylauryl(meth)acrylate; hydroxyethyl(meth)acrylamide, and other monomers such as (4-hydroxymethylcyclohexyl)methyl acrylate, N-methylol(meth)acrylamide, N-hydroxy(meth)acrylamide, allyl alcohol, 2-hydroxyethyl vinyl ether, 4-hydroxybutyl vinyl ether, diethylene glycol monovinyl ether, caprolactone adducts of acrylic acid, polyethylene glycol(meth)acrylate, and polypropylene glycol(meth)acrylate. In particular, hydroxyalkyl(meth)acrylates are preferred.

The hydroxyl group-containing monomer may be used in an amount of 0.01 to 5% by weight, based on the total amount of the monomer components used to form the (meth)acrylic polymer. The amount of the hydroxyl group-containing monomer is preferably from 0.01 to 2% by weight, more preferably from 0.01 to 1.5% by weight, even more preferably from 0.01 to 1% by weight, still more preferably from 0.05 to 0.5% by weight. In order to improve the durability, the hydroxyl group-containing monomer is preferably added in an amount of 0.01% by weight or more. Particularly when an isocyanate crosslinking agent is used, the hydroxyl group-containing monomer is preferably added in an amount of 0.01% by weight or more in terms of ensuring crosslinking points with the isocyanate group. On the other hand, if the amount of the hydroxyl group-containing monomer is more than 5% by weight, the adhesive strength can be undesirably high so that the releasability can be poor and that the reworkability requirements cannot be satisfied.

Any monomer component other than the monomers described above may be used in an amount of not more than 50% by weight of the total amount of the monomers used to form the (meth)acrylic polymer, as long as it does not reduce the effects of the present invention. The content of any other monomer is preferably 48% by weight or less, more preferably 45% by weight or less. Examples of any other monomer include aromatic ring-containing monomers having an aromatic ring and an unsaturated double bond-containing polymerizable functional group such as a (meth)acryloyl group or a vinyl group. Examples of the aromatic ring-containing monomer include phenoxyethyl(meth)acrylate, benzyl(meth)acrylate, phenol ethylene oxide-modified (meth)acrylate, 2-naphthoethyl(meth)acrylate, 2-(4-methoxy-1-naphthoxy)ethyl(meth)acrylate, phenoxypropyl(meth)acrylate, phenoxydiethylene glycol(meth)acrylate, thiol(meth)acrylate, phenyl(meth)acrylate, and polystyryl(meth)acrylate.

Examples of any other monomer also include acid anhydride group-containing monomers such as maleic anhydride and itaconic anhydride; sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl(meth)acrylate, and (meth)acryloyloxynaphthalenesulfonic acid; phosphate group-containing monomers such as 2-hydroxyethylacryloyl phosphate; and alkoxyalkyl(meth)acrylate monomers such as methoxyethyl(meth)acrylate and ethoxyethyl(meth)acrylate.

Examples of additional monomers that may be used include vinyl monomers such as vinyl acetate, vinyl propionate, styrene, α-methylstyrene, and N-vinylcaprolactam; epoxy group-containing acrylic monomers such as glycidyl(meth)acrylate; glycol acrylate monomers such as methoxyethylene glycol(meth)acrylate and methoxypolypropylene glycol(meth)acrylate; and (meth)acrylate monomers such as tetrahydrofurfuryl(meth)acrylate, fluoro(meth)acrylate, silicone(meth)acrylate, and 2-methoxyethyl acrylate.

Besides the above, a silicon atom-containing silane monomer may be exemplified as the copolymerizable monomer. Examples of the silane monomers include 3-acryloxypropyltriethoxysilane, vinyltrimethoxysilane, vinyltriethoxysilane, 4-vinylbutyltrimethoxysilane, 4-vinylbutyltriethoxysilane, 8-vinyloctyltrimethoxysilane, 8-vinyloctyltriethoxysilane, 10-methacryloyloxydecyltrimethoxysilane, 10-acryloyloxydecyltrimethoxysilane, 10-methacryloyloxydecyltriethoxysilane, and 10-acryloyloxydecyltriethoxysilane.

In the present invention, a (meth)acrylic polymer having a weight average molecular weight of 1,000,000 to 3,000,000 is generally used. In view of durability, particularly in view of heat resistance, the (meth)acrylic polymer to be used preferably has a weight average molecular weight of 1,500,000 to 2,500,000, more preferably of 1,700,000 to 2,500,000, even more preferably of 1,800,000 to 2,500,000. A weight average molecular weight of less than 1,500,000 is not preferred in view of heat resistance. A weight average molecular weight of more than 3,000,000 can reduce the lamination properties or the adhesive strength and thus is not preferred. The weight average molecular weight refers to a polystyrene-equivalent weight average molecular weight measured and calculated by gel permeation chromatography (GPC).

For the production of the (meth)acrylic polymer, any appropriate method may be selected from known production methods such as solution polymerization, bulk polymerization, emulsion polymerization, and various radical polymerization methods. The resulting (meth)acrylic polymer may be any type of copolymer such as a random copolymer, a block copolymer and a graft copolymer.

In a solution polymerization process, for example, ethyl acetate, toluene or the like is used as a polymerization solvent. In a specific solution polymerization process, for example, the reaction is performed under a stream of inert gas such as nitrogen at a temperature of about 50 to about 70° C. for about 5 to about 30 hours in the presence of a polymerization initiator.

Any appropriate polymerization initiator, chain transfer agent, emulsifying agent and so on may be selected and used for radical polymerization. The weight average molecular weight of the (meth)acrylic polymer may be controlled by the amount of addition of the polymerization initiator or the chain transfer agent or by the reaction conditions. The amount of the addition may be controlled as appropriate depending on the type of these materials.

Examples of the polymerization initiator include, but are not limited to, azo initiators such as 2,2'-azobisisobutylonitrile, 2,2'-azobis(2-amidinopropane)dihydrochloride, 2,2'-azobis[2-(5-methyl-2-imidazoline-2-yl)propane]dihydrochloride, 2,2'-azobis(2-methylpropionamidine)disulfate, 2,2'-azobis(N,N'-dimethyleneisobutylamidine), and 2,2'-azobis[N-(2-carboxyethyl)-2-methylpropionamidine]hydrate (VA-057, manufactured by Wako Pure Chemical Industries, Ltd.); persulfates such as potassium persulfate and ammonium persulfate; peroxide initiators such as di(2-ethylhexyl)peroxydicarbonate, di(4-tert-butylcyclohexyl)peroxydicarbonate, di-sec-butylperoxydicarbonate, tert-butylperoxyneodecanoate, tert-hexylperoxypivalate, tert-butylperoxypivalate, dilauroyl peroxide, di-n-octanoyl peroxide, 1,1,3,3-tetramethylbutylperoxy-2-ethyl hexanoate, di(4-methylbenzoyl)peroxide, dibenzoyl peroxide, tert-butylperoxyisobutylate, 1,1-di(tert-hexylperoxy)cyclohexane, tert-butylhydroperoxide, and hydrogen peroxide; and redox system initiators of a combination of a peroxide and a reducing agent, such as a combination of a persulfate and sodium hydrogen sulfite and a combination of a peroxide and sodium ascorbate.

One of the above polymerization initiators may be used alone, or two or more thereof may be used in a mixture. The total content of the polymerization initiator is preferably from about 0.005 to 1 part by weight, more preferably from about 0.02 to about 0.5 parts by weight, based on 100 parts by weight of the monomer.

For example, when 2,2'-azobisisobutyronitrile is used as a polymerization initiator for the production of the (meth) acrylic polymer with the above weight average molecular weight, the polymerization initiator is preferably used in a content of from about 0.06 to 0.2 parts by weight, more preferably of from about 0.08 to 0.175 parts by weight, based on 100 parts by weight of the total content of the monomer components.

Examples of the chain transfer agent include lauryl mercaptan, glycidyl mercaptan, mercaptoacetic acid, 2-mercaptoethanol, thioglycolic acid, 2-ethylhexyl thioglycolate, and 2,3-dimercapto-1-propanol. One of these chain transfer agents may be used alone, or two or more thereof may be used in a mixture. The total content of the chain transfer agent is preferably 0.1 parts by weight or less, based on 100 parts by weight of the total content of the monomer components.

Examples of the emulsifier used in emulsion polymerization include anionic emulsifiers such as sodium lauryl sulfate, ammonium lauryl sulfate, sodium dodecylbenzenesulfonate, ammonium polyoxyethylene alkyl ether sulfate, and sodium polyoxyethylene alkyl phenyl ether sulfate; and nonionic emulsifiers such as polyoxyethylene alkyl ether, polyoxyethylene alkyl phenyl ether, polyoxyethylene fatty acid ester, and polyoxyethylene-polyoxypropylene block polymers. These emulsifiers may be used alone, or two or more thereof may be used in combination.

The emulsifier may be a reactive emulsifier. Examples of such an emulsifier having an introduced radical-polymerizable functional group such as a propenyl group and an allyl ether group include Aqualon HS-10, HS-20, KH-10, BC-05, BC-10, and BC-20 (each manufactured by Dai-ichi Kogyo Seiyaku Co., Ltd.) and Adekaria Soap SE10N (manufactured by Asahi Denka Kogyo K.K.). The reactive emulsifier is preferred, because after polymerization, it can be incorporated into a polymer chain to improve water resistance. Based on 100 parts by weight of the total monomer component, the emulsifier is preferably used in a content of 0.3 to 5 parts by weight, more preferably of 0.5 to 1 parts by weight, in view of polymerization stability or mechanical stability.

The pressure-sensitive adhesive composition of the present invention also includes a peroxide.

In the present invention, any peroxide capable of generating active radical species by heating or photoirradiation and promoting the crosslinking of the base polymer in the pressure-sensitive adhesive composition may be appropriately used. In view of workability and stability, a peroxide with a one-minute half-life temperature of 80° C. to 160° C. is preferably used, and a peroxide with a one-minute half-life temperature of 90° C. to 140° C. is more preferably used. If the one-minute half-life temperature is too low, the reaction can proceed during storage before coating and drying so that coating can be made impossible due to an increase in viscosity. On the other hand, if the one-minute half-life temperature is too high, the crosslinking reaction temperature can be high so that a side reaction can occur, or a large part of the peroxide can remain unreacted so that crosslinking can undesirably proceed over time in some cases.

Examples of the peroxide for use in the present invention include di(2-ethylhexyl)peroxydicarbonate (one-minute half-life temperature: 90.6° C.), di(4-tert-butylcyclohexyl) peroxydicarbonate (one-minute half-life temperature: 92.1° C.), di-sec-butyl peroxydicarbonate (one-minute half-life temperature: 92.4° C.), tert-butyl peroxyneodecanoate (one-minute half-life temperature: 103.5° C.), tert-hexyl peroxypivalate (one-minute half-life temperature: 109.1° C.), tert-butyl peroxypivalate (one-minute half-life temperature: 110.3° C.), dilauroyl peroxide (one-minute half-life temperature: 116.4° C.), di-n-octanoylperoxide (one-minute half-life temperature: 117.4° C.), 1,1,3,3-tetramethylbutylperoxy-2-ethyl hexanoate (one-minute half-life temperature: 124.3° C.), di(4-methylbenzoyl)peroxide (one-minute half-life temperature: 128.2° C.), dibenzoyl peroxide (one-minute half-life temperature: 130.0° C.), tert-butyl peroxyisobutylate (one-minute half-life temperature: 136.1° C.), and 1,1-di (tert-hexylperoxy)cyclohexane (one-minute half-life temperature: 149.2° C.). In particular, di(4-tert-butylcyclohexyl) peroxydicarbonate (one-minute half-life temperature: 92.1° C.), dilauroyl peroxide (one-minute half-life temperature: 116.4° C.), dibenzoyl peroxide (one-minute half-life temperature: 130.0° C.), or the like is preferably used, because they can provide high crosslinking reaction efficiency.

The half life of the peroxide is an indicator of how fast the peroxide can be decomposed and refers to the time required for the amount of the peroxide to reach one half of its original value. The decomposition temperature required for a certain half life and the half life time obtained at a certain temperature are shown in catalogs furnished by manufacturers, such as "Organic Peroxide Catalog, 9th Edition, May, 2003" furnished by NOF CORPORATION.

One or more of the peroxides may be used alone or in combination. The total content of the peroxide is from 0.01 to 2 parts by weight, preferably from 0.04 to 1.5 parts by weight, more preferably from 0.05 to 1 part by weight, based on 100 parts by weight of the (meth)acrylic polymer. If the content is less than 0.01 parts by weight, crosslinking can be insufficient so that crosslink stability cannot be improved, which is not preferred in view of reworkability or processability. On the other hand, if the content is more than 2 parts by weight, it is not preferred that the difficult releasability from the separator or the easy peel tendency according to the hard pressure-sensitive adhesive layer because of durability.

When the peroxide is used as a polymerization initiator, the peroxide residue without being used for the polymerization reaction may be used for the crosslinking reaction. In this case, the amount of the peroxide residue may be quantified, and if necessary, the peroxide may be added again to be used in a specific amount.

The amount of decomposition of the peroxide may be determined by measuring the peroxide residue after the reaction process by high performance liquid chromatography (HPLC).

More specifically, for example, after the reaction process, about 0.2 g of each pressure-sensitive adhesive composition is taken out, immersed in 10 ml of ethyl acetate, subjected to shaking extraction at 25° C. and 120 rpm for 3 hours in a shaker, and then allowed to stand at room temperature for 3 days. Thereafter, 10 ml of acetonitrile is added, and the mixture is shaken at 25° C. and 120 rpm for 30 minutes. About 10 µl of the liquid extract obtained by filtration through a membrane filter (0.45 μm) is subjected to HPLC by injection and analyzed so that the amount of the peroxide after the reaction process is determined.

An organic crosslinking agent or a polyfunctional metal chelate may also be used as the crosslinking agent in combination with the peroxide. Examples of the organic crosslinking agent include epoxy crosslinking agents, isocyanate crosslinking agents and imine crosslinking agents. The polyfunctional metal chelate may comprise a polyvalent metal and an organic compound that is covalently or coordinately bonded to the metal. Examples of the polyvalent metal atom include Al, Cr, Zr, Co, Cu, Fe, Ni, V, Zn, In, Ca, Mg, Mn, Y, Ce, Sr, Ba, Mo, La, Sn, and Ti. The organic compound has a covalent or coordinate bond-forming atom such as an oxygen atom. Examples of the organic compound include alkyl esters, alcohol compounds, carboxylic acid compounds, ether compounds, and ketone compounds. Among these crosslinking agents, isocyanate crosslinking agents are particularly preferred.

Examples of the isocyanate crosslinking agent include aromatic isocyanates such as tolylene diisocyanate and xylene diisocyanate, alicyclic isocyanates such as isophorone diisocyanate, and aliphatic isocyanates such as hexamethylene diisocyanate.

More specifically, examples of the isocyanate crosslinking agent include lower aliphatic polyisocyanates such as butylene diisocyanate and hexamethylene diisocyanate; alicyclic isocyanates such as cyclopentylene diisocyanate, cyclohexylene diisocyanate and isophorone diisocyanate; aromatic diisocyanates such as 2,4-tolylene diisocyanate, 4,4'-diphenylmethane diisocyanate, xylylene diisocyanate, and polymethylene polyphenyl isocyanate; isocyanate adducts such as a trimethylolpropane-tolylene diisocyanate trimer adduct (Coronate L (trade name) manufactured by Nippon Polyurethane Industry Co., Ltd), a trimethylolpropane-hexamethylene diisocyanate trimer adduct (Coronate HL (trade name) manufactured by Nippon Polyurethane Industry Co., Ltd) and an isocyanurate of hexamethylene diisocyanate (Coronate HX (trade name) manufactured by Nippon Polyurethane Industry Co., Ltd); polyether polyisocyanates and polyester polyisocyanates; adducts thereof with various polyols; and polyisocyanates polyfunctionalized with an isocyanurate bond, a biuret bond, an allophanate bond, or the like.

One or more of the isocyanate crosslinking agents may be used alone or in combination. The total content of the isocyanate crosslinking agent is preferably from 0.01 to 2 parts by weight, more preferably from 0.04 to 1.5 parts by weight, even more preferably from 0.05 to 1 part by weight, based on 100 parts by weight of the (meth)acrylic polymer. A content of less than 0.01 parts by weight could provide insufficient cohesion and thus is not preferred. A content of more than 2 parts by weight may tend to cause peeling in a durability test and thus is not preferred.

When the pressure-sensitive adhesive layer is formed using the peroxide crosslinking agent and the isocyanate crosslinking agent, not only the control of the amount of addition of these agents but also the effect of the crosslinking temperature or the crosslinking time should be well taken into account.

For example, the crosslinking temperature or the crosslinking time is preferably controlled such that the peroxide in the pressure-sensitive adhesive composition can be decomposed by 50% by weight or more, more preferably by 60% by weight or more, still more preferably by 70% by weight or more. If the peroxide is decomposed by less than 50% by weight, the content of the peroxide residue in the pressure-sensitive adhesive composition can be relative high so that the crosslinking reaction can undesirably proceed with time even after the crosslinking process.

More specifically, for example, when the crosslinking process is performed at a one-minute half-life temperature, the peroxide is decomposed by 50% by weight in one minute, by 75% by weight in two minutes, and therefore, the crosslinking should be performed for a time period of one minute or more. For example, when the peroxide has a half life (half-value period) of 30 seconds at the crosslinking temperature, the crosslinking process should be performed for a time period of 30 seconds or more. For example, when the peroxide has a half life (half-value period) of 5 minutes or more at the crosslinking temperature, the crosslinking process should be performed for a time period of 5 minutes or more.

The crosslinking temperature or the crosslinking time may be theoretically calculated from the half life (half-value period) of the peroxide to be used, assuming that linear proportionality is established, and the amount of addition of the peroxide may be controlled as appropriate. Since side reactions can more likely occur at higher temperature, the crosslinking temperature is preferably 170° C. or lower.

The crosslinking process may be performed at the temperature of the step of drying the pressure-sensitive adhesive layer, or the crosslinking process may be separately performed after the drying process.

While the crosslinking time may be determined taking productivity or workability into account, it is generally from about 0.2 to 20 minutes, preferably from about 0.5 to 10 minutes.

A silane coupling agent may also be used for the pressure-sensitive adhesive composition for use in the present invention in order to increase adhesive strength or durability. Any appropriate known silane coupling agent may be used.

Examples of silane coupling agents include epoxy group-containing silane coupling agents such as 3-glycidoxypropyltrimethoxysilane, 3-glycidoxypropyltriethoxysilane, 3-glycidoxypropylmethyldiethoxysilane, and 2-(3,4-epoxycyclohexyl)ethyltrimethoxysilane; amino group-containing silane coupling agents such as 3-aminopropyltrimethoxysilane, N-(2-aminoethyl)-3-aminopropylmethyldimethoxysilane, and 3-triethoxysilyl-N-(1,3-dimethylbutylidene)propylamine; (meth)acrylic group-containing silane coupling agents such as 3-acryloxypropyltrimethoxysilane and 3-methacryloxypropyltriethoxysilane; and isocyanate group-containing silane coupling agents such as 3-isocyanatepropyltriethoxysilane. Such silane coupling agents are preferably used to increase durability.

The silane coupling agent may be used alone, or two or more thereof may be used in a mixture. The total content of the silane coupling agent is preferably from 0.01 to 2 parts by weight, more preferably from 0.02 to 0.6 parts by weight, still more preferably from 0.05 to 0.3 parts by weight, based on 100 parts by weight of the (meth)acrylic polymer. If the content is less than 0.01 parts by weight, it is insufficient to improve durability. If the content is more than 2 parts by weight, it may be decrease the reworkability because of too much adhesive strength to the optical member such as a liquid crystal cell.

The pressure-sensitive adhesive composition of the present invention may also contain any other known additive. For example, a tackifier, a powder such as a colorant and a pigment, a dye, a surfactant, a plasticizer, a surface lubricant, a leveling agent, a softening agent, an antioxidant, an age resister, a light stabilizer, an ultraviolet absorbing agent, a polymerization inhibitor, an inorganic or organic filler, a metal powder, or a particle- or foil-shaped material may be added as appropriate depending on the intended use. A redox system including an added reducing agent may also be used in the controllable range.

The pressure-sensitive adhesive layer of the present invention for an optical film is formed from the pressure-sensitive adhesive composition for an optical film. The pressure-sensitive adhesive layer preferably has a gel fraction of 50 to 95% by weight in view of workability capable of satisfying the requirements for easy releasability or peelability from a separator. The gel fraction is preferably from 55 to 90% by weight, more preferably from 60 to 90% by weight. The gel fraction may be a value measured by the method described in the section "Examples."

The pressure-sensitive adhesive layer for an optical film may be formed by applying the composition to a base material and then curing the composition by heat treatment. The pressure-sensitive adhesive optical film of the present invention includes an optical film and a pressure-sensitive adhesive layer that is formed from the pressure-sensitive adhesive on at least one side of the optical film.

For example, the pressure-sensitive adhesive layer may be formed by a method that includes applying the pressure-sensitive adhesive composition to a release-treated separator or the like serving as the base material, removing polymerization solvents and so on by drying and curing the composition to form a pressure-sensitive adhesive layer, and then transferring the pressure-sensitive adhesive layer onto an optical film. Alternatively, the pressure-sensitive adhesive layer may be formed by a method that includes directly applying the pressure-sensitive adhesive composition to an optical film serving as the base material and removing polymerization solvents and so on by drying and curing the composition to form a pressure-sensitive adhesive layer on the optical film. Before the pressure-sensitive adhesive is applied, one or more optional solvents other than the polymerization solvents may be further added to the pressure-sensitive adhesive.

The pressure-sensitive adhesive layer is preferably formed by a process including applying the pressure-sensitive adhesive composition for an optical film to a base material and then subjecting the composition to treatment at a temperature of 70 to 160° C. for a time period of 30 to 240 seconds to cure (and dry) it. The curing temperature is preferably from 80 to 160° C., more preferably from 100 to 155° C. The curing time is preferably from 30 to 180 seconds, more preferably from 30 to 120 seconds.

The pressure-sensitive adhesive composition for an optical film of the present invention can be quickly cured at low temperature (120° C. or lower) as described above, because it contains a tertiary amino group-containing (meth)acrylic polymer as a base polymer and contains a peroxide as a crosslinking agent. When a conventional pressure-sensitive adhesive for an optical film, which contains a peroxide as a crosslinking agent, is cured at the low temperature, the peroxide remains and changes over time so that the peelability from a separator can typically increase. In contrast, the pressure-sensitive adhesive composition of the present invention is quickly curable at the low temperature so that easy peelability from a separator can be constantly maintained over time.

The treatment conditions described above is particularly suitable for cases where the pressure-sensitive adhesive composition for an optical film of the present invention contains a silane coupling agent. When a conventional pressure-sensitive adhesive composition containing a silane coupling agent is cured at a high temperature of more than 140° C. for a time period of more than 120 seconds, the silane coupling agent is vaporized so that the residual amount is reduced, which leads to insufficient long-term durability. In contrast, the pressure-sensitive adhesive composition of the present invention is quickly curable at the low temperature and thus can hold the silane coupling agent for a long time so that long-term durability can be maintained and that product life can be extended.

In the process of preparing the pressure-sensitive adhesive optical film of the present invention, the surface of an optical film may be coated with an anchor layer or subjected to any of various adhesion-facilitating treatments such as corona treatment and plasma treatment, before the pressure-sensitive adhesive layer is formed. The surface of the pressure-sensitive adhesive layer may also be subjected to adhesion facilitating treatment.

Various methods may be used to form the pressure-sensitive adhesive layer. Specific examples of such methods include roll coating, kiss roll coating, gravure coating, reverse coating, roll brush coating, spray coating, dip roll coating, bar coating, knife coating, air knife coating, curtain coating, lip coating, and extrusion coating with a die coater or the like.

The thickness of the pressure-sensitive adhesive layer is typically, but not limited to, from about 1 to 100 μm, preferably from 5 to 50 μm, more preferably from 10 to 30 μm.

When the pressure-sensitive adhesive layer is exposed, the pressure-sensitive adhesive layer may be protected with a sheet having undergone release treatment (a separator) before practical use.

Examples of the material for forming the separator include a plastic film such as a polyethylene, polypropylene, polyethylene terephthalate, or polyester film, a porous material such as paper, cloth and nonwoven fabric, and an appropriate thin material such as a net, a foamed sheet, a metal foil, and a laminate thereof. In particular, a plastic film is preferably used, because of its good surface smoothness.

The plastic film may be any film capable of protecting the pressure-sensitive adhesive layer, and examples thereof include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film.

The thickness of the separator is generally from about 5 to about 200 μm, preferably from about 5 to about 100 μm. If necessary, the separator may be treated with a release agent such as a silicone, fluorine, long-chain alkyl, or fatty acid amide release agent, or may be subjected to release and antifouling treatment with silica powder or to antistatic treatment of coating type, kneading and mixing type, vapor-deposition type, or the like. In particular, if the surface of the separator is appropriately subjected to release treatment such as silicone treatment, long-chain alkyl treatment, and fluorine treatment, the releasability from the pressure-sensitive adhesive layer can be further increased. The pressure-sensitive adhesive layer of the present invention is suitable for a release-treated separator and particularly suitable for a separator release-treated with a silicone material.

In the above production method, the release-treated sheet may be used without modification as a separator for the pressure-sensitive adhesive sheet, the pressure-sensitive adhesive optical film or the like, so that the process can be simplified.

The optical film may be of any type for use in forming image displays such as liquid crystal displays. For example, a polarizing plate is exemplified as the optical film. A polarizing plate including a polarizer and a transparent protective film provided on one or both sides of the polarizer is generally used.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine, is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

A thermoplastic resin with a high level of transparency, mechanical strength, thermal stability, moisture blocking properties, isotropy, and the like may be used as a material for forming the transparent protective film. Examples of such a thermoplastic resin include cellulose resins such as triacetyl-cellulose, polyester resins, polyethersulfone resins, polysulfone resins, polycarbonate resins, polyamide resins, polyimide resins, polyolefin resins, (meth)acrylic resins, cyclic olefin polymer resins (norbornene resins), polyarylate resins, polystyrene resins, polyvinyl alcohol resins, and any mixture thereof. The transparent protective film is generally laminated to one side of the polarizer with the adhesive layer, but thermosetting resins or ultraviolet curing resins such as (meth)acrylic, urethane, acrylic urethane, epoxy, or silicone resins may be used to other side of the polarizer for the transparent protective film. The transparent protective film may also contain at least one type of any appropriate additive. Examples of the additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, still more preferably from 60 to 98% by weight, particularly preferably from 70 to 97% by weight. If the content of the thermoplastic resin in the transparent protective film is 50% by weight or less, high transparency and other properties inherent in the thermoplastic resin can fail to be sufficiently exhibited.

Moreover, as is described in JP-A No. 2001-343529 (WO 01/37007), polymer films, for example, resin compositions including (A) thermoplastic resins having substituted and/or non-substituted imido group in sidechain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. Since the films are less in retardation and less in photoelastic coefficient, faults such as unevenness due to a strain in a polarizing plate can be removed and besides, since they are less in moisture permeability, they are excellent in durability under humidified environment.

Thickness of the transparent protective film can be properly determined and generally in the range of from about 1 to 500 μm from the viewpoint of a strength, workability such as handlability, requirement for a thin film and the like. Especially, the thickness is preferably in the range of from 1 to 300 μm and more preferably in the range of from 5 to 200 μm. Therefore, it is particularly preferred that the transparent protective film has a thickness of 5 to 150 μm.

Note that in a case where the transparent protective films are provided on both sides of a polarizer, the protective films made from the same polymer may be used on both sides thereof or alternatively, the protective films made from polymer materials different from each other may also be used on respective both sides thereof.

At least one selected from a cellulose resin, a polycarbonate resin, a cyclic polyolefin resin, and a (meth)acrylic resin is preferably used for the transparent protective film according to the present invention. The electron beam curing adhesive for use in the polarizing plate according to the present invention exhibits good adhesion to various types of transparent protective films. In particular, the electron beam curing adhesive for use in the polarizing plate according to the present invention exhibits good adhesion to acrylic resins, to which it has been difficult to provide satisfactory adhesion by conventional techniques.

The cellulose resin is an ester of cellulose and a fatty acid. Examples of such a cellulose ester resin include triacetyl cellulose, diacetyl cellulose, tripropionyl cellulose, dipropionyl cellulose, and the like. In particular, triacetyl cellulose is preferred. Much commercially available triacetyl celluloses are placing on sale and are advantageous in view of easy availability and cost. Examples of commercially available products of triacetyl cellulose include UV-50, UV-80, SH-80, TD-80U, TD-TAC, and UZ-TAC (trade names) manufactured by Fujifilm Corporation, and KC series manufactured by Konica Minolta. In general, these triacetyl cellulose products have a thickness direction retardation (Rth) of about 60 nm or less, while having an in-plane retardation (Re) of almost zero.

Cellulose resin films with relatively small thickness direction retardation may be obtained by processing any of the above cellulose resins. Examples of the processing method include a method that includes laminating a general cellulose-based film to a base film such as a polyethylene terephthalate, polypropylene, or stainless steel film, coated with a solvent such as cyclopentanone or methyl ethyl ketone, drying the laminate by heating (for example, at 80 to 150° C. for 3 to 10 minutes) and then separating the base film; and a method that includes coating a general cellulose resin film with a solution of a norbornene resin, a (meth)acrylic resin or the like in a solvent such as cyclopentanone or methyl ethyl ketone, drying the coated film by heating (for example, at 80 to 150° C. for 3 to 10 minutes), and then separating the coating.

The cellulose resin film with a relatively small thickness direction retardation to be used may be a fatty acid cellulose resin film with a controlled degree of fat substitution. While triacetyl cellulose for general use has a degree of acetic acid substitution of about 2.8, preferably, the degree of acetic acid substitution is controlled to 1.8 to 2.7, so that the Rth can be reduced. The Rth may also be controlled to be low by adding a plasticizer such as dibutyl phthalate, p-toluenesulfonanilide, and acetyl triethyl citrate, to the fatty acid-substituted cellulose resin. The plasticizer is preferably added in amount of 40 parts by weight or less, more preferably of 1 to 20 parts by weight, still more preferably of 1 to 15 parts by weight, to 100 parts by weight of the fatty acid cellulose resin.

For example, the cyclic polyolefin resin is preferably a norbornene resin. Cyclic olefin resin is a generic name for resins produced by polymerization of cyclic olefin used as a polymerizable unit, and examples thereof include the resins disclosed in JP-A Nos. 01-240517, 03-14882, and 03-122137. Specific examples thereof include ring-opened (co)polymers of cyclic olefins, addition polymers of cyclic olefins, copolymers (typically random copolymers) of cyclic olefins and α-olefins such as ethylene and propylene, graft polymers produced by modification thereof with unsaturated carboxylic acids or derivatives thereof, and hydrides thereof. Examples of the cyclic olefin include norbornene monomers.

Various commercially available cyclic polyolefin resins are placing on sale. Examples thereof include Zeonex (trade name) and Zeonor (trade name) series manufactured by Zeon Corporation, Arton (trade name) series manufactured by JSR Corporation, Topas (trade name) series manufactured by Ticona, and Apel (trade name) series manufactured by Mitsui Chemicals, Inc.

The (meth)acrylic resin preferably has a glass transition temperature (Tg) of 115° C. or more, more preferably of 120° C. or more, still more preferably of 125° C. or more, particularly preferably of 130° C. or more. If the Tg is 115° C. or more, the resulting polarizing plate can have good durability. The upper limit to the Tg of the (meth)acrylic resin is preferably, but not limited to, 170° C. or less, in view of formability and the like. The (meth)acrylic resin can form a film with an in-plane retardation (Re) of almost zero and a thickness direction retardation (Rth) of almost zero.

Any appropriate (meth)acrylic resin may be used as long as the advantages of the present invention are not reduced. Examples of such a (meth)acrylic resin include poly(meth)acrylate such as poly(methyl methacrylate), methyl methacrylate-(meth)acrylic acid copolymers, methyl methacrylate-(meth)acrylate copolymers, methyl methacrylate-acrylate-(meth)acrylic acid copolymers, methyl(meth)acrylate-styrene copolymers (such as MS resins), and alicyclic hydrocarbon group-containing polymers (such as methyl methacrylate-cyclohexyl methacrylate copolymers and methyl methacrylate-norbornyl (meth)acrylate copolymers). Poly($C_{1-6}$ alkyl(meth)acrylate) such as poly(methyl (meth)acrylate) is preferred, and a methyl methacrylate-based resin mainly composed of a methyl methacrylate unit (50 to 100% by weight, preferably 70 to 100% by weight) is more preferred.

Examples of the (meth)acrylic resin include Acrypet VH and Acrypet VRL20A each manufactured by Mitsubishi Rayon Co., Ltd., (meth)acrylic resins having a ring structure in their molecule as disclosed in JP-A No. 2004-70296, and high-Tg (meth)acrylic resins produced by intramolecular crosslinking or intramolecular cyclization reaction.

Lactone ring structure-containing (meth)acrylic resins may also be used, because they have high heat resistance and high transparency and also have high mechanical strength after biaxially stretched.

Examples of the lactone ring structure-containing (meth)acrylic reins include the lactone ring structure-containing (meth)acrylic reins disclosed in JP-A Nos. 2000-230016, 2001-151814, 2002-120326, 2002-254544, and 2005-146084.

The lactone ring structure-containing (meth)acrylic reins preferably have a ring structure represented by Formula (I):

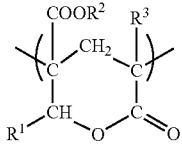

[Formula 1]

wherein $R^1$, $R^2$ and $R^3$ each independently represent a hydrogen atom or an organic residue of 1 to 20 carbon atoms. The organic residue may contain an oxygen atom(s).

The content of the lactone ring structure represented by Formula (I) in the lactone ring structure-containing (meth)acrylic resin is preferably from 5 to 90% by weight, more preferably from 10 to 70% by weight, still more preferably from 10 to 60% by weight, particularly preferably from 10 to 50% by weight. If the content of the lactone ring structure represented by Formula (I) in the lactone ring structure-containing (meth)acrylic resin is less than 5% by weight, its heat resistance, solvent resistance or surface hardness can be insufficient. If the content of the lactone ring structure represented by Formula (I) in the lactone ring structure-containing (meth)acrylic resin is more than 90% by weight, its formability or workability can be poor.

The lactone ring structure-containing (meth)acrylic resin preferably has a mass average molecular weight (also referred to as weight average molecular weight) of 1,000 to 2,000,000, more preferably of 5,000 to 1,000,000, still more preferably of 10,000 to 500,000, particularly preferably of 50,000 to 500,000. A mass average molecular weight outside the above range is not preferred in view of formability or workability.

The lactone ring structure-containing (meth)acrylic resin preferably has a Tg of 115° C. or more, more preferably of 120° C. or more, still more preferably of 125° C. or more, particularly preferably of 130° C. or more. For example, the resin with a Tg of 115° C. or more can produce good durability, when it is incorporated in the form of a transparent protective film in a polarizing plate. The upper limit to the Tg of the lactone ring structure-containing (meth)acrylic resin is preferably, but not limited to, 170° C. or less in view of formability and the like.

The total light transmittance of the lactone ring structure-containing (meth)acrylic resin, which may be measured according to ASTM-D-1003 with respect to injection molded products, is preferably as high as possible, and specifically, it is preferably 85% or more, more preferably 88% or more, still more preferably 90% or more. The total light transmittance is an index of transparency, and a total light transmittance of less than 85% can result in reduced transparency.

The transparent protective film to be used generally has an in-plane retardation of less than 40 nm and a thickness direction retardation of less than 80 nm. The in-plane retardation Re is expressed by the formula Re=(nx−ny)×d, the thickness direction retardation Rth is expressed by the formula Rth=(nx−nz)×d, and the Nz coefficient is represented by the formula Nz=(nx−nz)/(nx−ny), where nx, ny and nz are the refractive indices of the film in the directions of its slow axis, fast axis and thickness, respectively, d is the thickness (nm) of the film, and the direction of the slow axis is a direction in which the in-plane refractive index of the film is maximum.

Moreover, it is preferable that the transparent protective film may have as little coloring as possible. A protective film having a thickness direction retardation of from −90 nm to +75 nm may be preferably used. Thus, coloring (optical coloring) of polarizing plate resulting from a protective film may mostly be cancelled using a protective film having a thickness direction retardation (Rth) of from −90 nm to +75 nm. The thickness direction retardation (Rth) is preferably from −80 nm to +60 nm, and especially preferably from −70 nm to +45 nm.

Alternatively, the transparent protective film to be used may be a retardation plate having an in-plane retardation of 40 nm or more and/or a thickness direction retardation of 80 nm or more. The in-plane retardation is generally controlled in the range of 40 to 200 nm, and the thickness direction retardation is generally controlled in the range of 80 to 300 nm. The retardation plate for use as the transparent protective film also has the function of the transparent protective film and thus can contribute to a reduction in thickness.

Examples of the retardation plate include a birefringent film produced by uniaxially or biaxially stretching a polymer material, an oriented liquid crystal polymer film, and an oriented liquid crystal polymer layer supported on a film. The thickness of the retardation plate is generally, but not limited to, from about 20 to 150 μm.

Examples of the polymer material include polyvinyl alcohol, polyvinyl butyral, poly(methyl vinyl ether), poly(hydroxyethyl acrylate), hydroxyethyl cellulose, hydroxypropyl cellulose, methylcellulose, polycarbonate, polyarylate, polysulfone, polyethylene terephthalate, polyethylene naphthalate, polyethersulfone, polyphenylene sulfide, polyphenylene oxide, polyallylsulfone, polyamide, polyimide, polyolefin, polyvinyl chloride, cellulose resins, cyclic polyolefin resins (norbornene reins), and various types of binary or ternary copolymers thereof, graft copolymers thereof, and any blend thereof. Any of these polymer materials may be formed into an oriented product (a stretched film) by stretching or the like.

Examples of the liquid crystal polymer include various main-chain or side-chain types having a liquid crystal molecular orientation property-imparting conjugated linear atomic group (mesogen) introduced in a main or side chain of a polymer. Examples of the main chain type liquid crystal polymer include polymers having a mesogen group bonded thereto via a flexibility-imparting spacer moiety, such as nematically ordered polyester liquid-crystalline polymers, discotic polymers, and cholesteric polymers. For example, the side-chain type liquid crystal polymer may be a polymer comprising: a main chain skeleton of polysiloxane, polyacrylate, polymethacrylate, or polymalonate; and a side chain having a mesogen moiety that comprises a nematic orientation-imparting para-substituted cyclic compound unit and is bonded thereto via a spacer moiety comprising a conjugated atomic group. For example, any of these liquid crystal polymers may be applied by a process that includes spreading a solution of the liquid crystalline polymer on an alignment surface such as a rubbed surface of a thin film of polyimide, polyvinyl alcohol or the like, formed on the glass plate, and an obliquely vapor-deposited silicon oxide surface, and heat-treating it.

The retardation plate may have any appropriate retardation depending on the intended use such as compensation for coloration, viewing angle, or the like due to the birefringence of various wave plates or liquid crystal layers. Two or more types of retardation plates may also be laminated to provide controlled optical properties, including retardation.

A retardation plate satisfying the relation: nx=ny>nz, nx>ny>nz, nx>ny=nz, nx>nz>ny, nz=nx>ny, nz>nx>ny, or nz>nx=ny may be selected and used depending on various applications. The relation ny=nz includes not only the case where ny is completely equal to nz but also the case where ny is substantially equal to nz.

For example, the retardation plate satisfying the relation nx>ny>nz to be used preferably has a in-plane retardation of 40 to 100 nm, a thickness retardation of 100 to 320 nm, and an Nz coefficient of 1.8 to 4.5. For example, the retardation plate satisfying the relation nx>ny=nz (positive A plate) to be used preferably has a in-plane retardation of 100 to 200 nm. For example, the retardation plate satisfying the relation nz=nx>ny (negative A plate) to be used preferably has a in-plane retardation of 100 to 200 nm. For example, the retardation plate satisfying the relation nx>nz>ny to be used preferably has a in-plane retardation of 150 to 300 nm and an Nz coefficient of more than 0 and not more than 0.7. As described above, for example, the retardation plate satisfying the relation nx=ny>nz, nz>nx>ny or nz>nx=ny may also be used.

The transparent protective film may be appropriately selected depending on the liquid crystal display to be produced therewith. In the case of VA (Vertical Alignment, including MVA and PVA), it is preferred that the transparent protective film on at least one side of the polarizing plate (on the cell side) has a retardation. Specifically, it preferably has a retardation Re in the range of 0 to 240 nm and a retardation Rth in the range of 0 to 500 nm. In terms of three-dimensional refractive index, the case of nx>ny=nz, nx>ny>nz, nx>nz>ny, or nx=ny>nz (uniaxial, biaxial, Z conversion, negative C-plate) is preferred. When polarizing plates are used on upper and lower sides of a liquid crystal cell, the transparent protective films may have a retardation on upper and lower sides of the liquid crystal cell, or one of the upper and lower transparent protective films may has a retardation.

For example, in the case of IPS (In-Plane Switching, including FFS), the transparent protective film for use in one of the polarizing plates may have or may not have a retardation. For example, a transparent protective film with no retardation is preferably provided on both upper and lower sides of a liquid crystal cell (cell sides), or otherwise a transparent protective film with a retardation is preferably provided on both or one of the upper and lower sides of a liquid crystal cell (for example, Z conversion on the upper side with no retardation on the lower side or an A-plate provided on the upper side with a positive C-plate provided on the lower side). When it has a retardation, it preferably has a retardation Re in the range of −500 to 500 nm and a retardation Rth in the range of −500 to 500 nm. In terms of three-dimensional refractive index, nx>ny=nz, nx>nz>ny, nz>nx=ny, or nz>nx>ny (uniaxial, Z conversion, positive C-plate, positive A-plate) is preferred.

The film with retardation may be separately prepared and laminated to a transparent protective film with no retardation so that the function described above can be provided.

The polarizer or the transparent protective film may be subjected to surface modification treatment before it is applied with the adhesive. Specific examples of such treatment include corona treatment, plasma treatment, primer treatment, saponification treatment, and coupling agent treatment.

A hard coat layer may be prepared, or antireflection processing, processing aiming at sticking prevention, diffusion or anti glare may be performed onto the face on which the polarizing film of the above described transparent protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer, which is exemplified such as diffusion layer of backlight side.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 µm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 70 weight parts to the transparent resin 100 weight parts that forms the fine concavo-convex structure on the surface, and preferably 5 to 50 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective film.

An adhesive may be used to bond the polarizer to the transparent protective film. Examples of the adhesive include isocyanate adhesives, polyvinyl alcohol adhesives, gelatin adhesives, vinyl adhesives, latex adhesives, and aqueous polyester adhesives. The adhesive is generally used in the form of an aqueous solution generally having a solids content of 0.5 to 60% by weight. Besides the above adhesives, ultraviolet-curable adhesives, electron beam-curable adhesives or the like may also be used to bond the polarizer to the transparent protective film. Electron beam-curable adhesives for polarizing plates exhibit good adhesion to the above different types of transparent protective films. Adhesives that may be used in an embodiment of the present invention may also contain a metal compound filler.

Further an optical film of the present invention may be used as other optical layers, such as a reflective plate, a transflective plate, a retardation plate (a half wavelength plate and a quarter wavelength plate included), and a viewing angle compensation film, which may be used for formation of a liquid crystal display etc. These are used in practice as an optical film, or as one layer or two layers or more of optical layers laminated with polarizing plate.

Especially preferable polarizing plates are; a reflection type polarization plate or a transflective type polarization plate in which a reflective plate or a transflective reflective plate is further laminated onto a polarizing plate of the present invention; an elliptically polarizing plate or a circular polarizing plate in which a retardation plate is further laminated onto the polarizing plate; a wide viewing angle polarization plate in which a viewing angle compensation film is further laminated onto the polarizing plate; or a polarizing plate in which a brightness enhancement film is further laminated onto the polarizing plate.

A reflective layer is prepared on a polarization plate to give a reflection type polarization plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarization plate may be formed using suitable methods, such as a method in which a reflective layer of metal etc. is, if required, attached to one side of a polarization plate through a transparent protective layer etc.

As an example of a reflection type polarization plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the transparent protective film, on which a reflective layer of concavo-convex structure is prepared, may be mentioned. The reflective layer that has the fine concavo-convex structure diffuses incident light by random reflection to prevent directivity and glaring appearance, and has an advantage of controlling unevenness of light and darkness etc. Moreover, the transparent protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the polarization plate, a reflection plate may also be used as a reflective sheet constituted by preparing a reflective layer on the suitable film for the transparent film. In addition, since a reflective layer is usually made of metal, it is desirable that the reflective side is covered with a protective film or a polarization plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the reflective layer as a transflective type reflective layer, such as a half-mirror etc. that reflects and transmits light. A transflective type polarization plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarization plate. That is, the transflective type polarization plate is useful to obtain of a liquid crystal display of the type that saves energy of light sources, such as a back light, in a well-lighted atmosphere, and can be used with a built-in light source if needed in a comparatively dark atmosphere etc.

A description of the elliptically polarization plate or circularly polarization plate on which the retardation plate is laminated to the polarization plates will be made in the following paragraph. These polarization plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarization plate is effectively used to give a monochrome display without the coloring by compensating (preventing) coloring (blue or yellow color) produced by birefringence of a liquid crystal layer of a super twisted nematic (STN) type liquid crystal display. Furthermore, a polarization plate in which three-dimensional refractive index is controlled may also preferably compensate (prevent) coloring produced when a screen of a liquid crystal display is viewed from an oblique direction. Circularly polarization plate is effectively used, for example, when adjusting a color tone of a picture of a reflection type liquid crystal display that provides a colored picture, and it also has function of antireflection.

The elliptically polarization plate and the reflected type elliptically polarization plate are laminated plate combining suitably a polarization plate or a reflection type polarization plate with a retardation plate. This type of elliptically polarization plate etc. may be manufactured by combining a polarization plate (reflected type) and a retardation plate, and by laminating them one by one separately in the manufacture process of a liquid crystal display. On the other hand, the polarization plate in which lamination was beforehand carried out and was obtained as an optical film, such as an elliptically polarization plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such viewing angle compensation retardation plate, in addition, a film having birefringence property that is processed by uniaxial stretching or orthogonal bidirectional stretching and a biaxially stretched film as inclined orientation film etc. may be used. As inclined orientation film, for example, a film obtained using a method in which a heat shrinking film is adhered to a polymer film, and then the combined film is heated and stretched or shrunk under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarization plate with which a polarization plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarization plate, which is obtained by laminating a brightness enhancement film to a polarization plate, thus does not transmit light without the predetermined polarization state and reflects it, while obtaining transmitted light with the predetermined polarization state by accepting a light from light sources, such as a backlight. This polarization plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarization plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the predetermined polarization axis, by arranging the polarization axis of the transmitted light and entering the light into a polarization plate as it is, the absorption loss by the polarization plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarization plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarization plate may consist of multi-layered film of laminated layers of a polarization plate and two of more of optical layers as the separated type polarization plate. Therefore, a polarization plate may be a reflection type elliptically polarization plate or a semi-transmission type elliptically polarization plate, etc. in which the reflection type polarization plate or a transflective type polarization plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised.

Proper adhesion means, such as a pressure-sensitive adhesive layer, may be used for laminating. On the occasion of adhesion of the above described polarizing plate and other optical layers, the optical axis may be set as a suitable configuration angle according to the target retardation characteristics etc.

In addition, ultraviolet absorbing property may be given to the each layer of the optical film and the pressure-sensitive adhesive layer etc. of the pressure-sensitive adhesive optical film of the present invention, using a method of adding UV absorbents, such as salicylic acid ester type compounds, benzophenol type compounds, benzotriazol type compounds, cyano acrylate type compounds, and nickel complex salt type compounds.

The pressure-sensitive adhesive optical film of the present invention is preferably used to form various types of image displays such as liquid crystal displays. Liquid crystal displays may be formed according to conventional techniques. Specifically, liquid crystal displays are generally formed by appropriately assembling a liquid crystal cell and the pressure-sensitive adhesive optical film and optionally other component such as a lighting system and incorporating a driving circuit according to any conventional technique, except that the pressure-sensitive adhesive optical film of the present invention is used. Any type of liquid crystal cell may also be used such as a TN type, an STN type, a n type a VA type and IPS type.

Suitable liquid crystal displays, such as liquid crystal display with which the pressure-sensitive adhesive optical film has been located at one side or both sides of the liquid crystal cell, and with which a backlight or a reflective plate is used for a lighting system may be manufactured. In this case, the optical film may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarization plate, while preparing the polarization plate on the surface side of the transparent electrode.

Since the retardation plate and the polarization plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarization plate and the retardation plate is adjusted to $\pi/4$, the mirror surface of the metal electrode may be completely covered.

This means that only linearly polarized light component of the external light that enters as incident light into this organic EL display is transmitted with the work of polarization plate. This linearly polarized light generally gives an elliptically polarized light by the retardation plate, and especially the retardation plate is a quarter wavelength plate, and moreover when the angle between the two polarization directions of the polarization plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarization plate, it cannot be transmitted through the polarization plate. As the result, mirror surface of the metal electrode may be completely covered.

EXAMPLES

The present invention is more specifically described using the examples below, which are not intended to limit the scope of the present invention. In each example, "part or parts" and "%" are all by weight, unless otherwise stated. The evaluation items in the examples and so on were measured as described below.

<Measurement of Weight Average Molecular Weight>

The weight average molecular weight of the resulting (meth)acrylic polymer was measured by gel permeation chromatography (GPC). The polymer sample was dissolved in dimethylformamide to form a 0.1% by weight solution. The solution was allowed to stand overnight and then filtered through a 0.45 μm membrane filter, and the resulting filtrate was used under the following conditions: analyzer, HLC-8120GPC manufactured by Tosoh Corporation; column, Super AWM-H, AW4000, AW2500, manufactured by Tosoh Corporation; column size, each 6.0 mmφ×150 mm; eluent, a dimethylformamide solution of 30 mM lithium bromide and 30 mM phosphoric acid; flow rate, 0.4 ml/minute; detector, differential refractometer (RI); column temperature, 40° C.; injection volume, 20 μl.

(Preparation of Polarizing Plate)

An 80 μm-thick polyvinyl alcohol film was stretched to 3 times between rolls different in velocity ratio, while it was dyed in a 0.3% iodine solution at 30° C. for 1 minute. The film was then stretched to a total stretch ratio of 6 times, while it was immersed in an aqueous solution containing 4% of boric acid and 10% of potassium iodide at 60° C. for 0.5 minutes. The film was then washed by immersion in an aqueous solution containing 1.5% of potassium iodide at 30° C. for 10 seconds and then dried at 50° C. for 4 minutes to give a polarizer. An 80 μm-thick saponified triacetylcellulose film was bonded to both sides of the polarizer with a polyvinyl alcohol adhesive to form a polarizing plate.

Production Example 1

Production of Acrylic Polymer

To a four-neck flask equipped with a stirring blade, a thermometer, a nitrogen gas introducing tube and a condenser were added 99.7 parts of butyl acrylate, 0.1 parts of N,N-dimethylaminoethyl acrylate, 0.1 parts of acrylic acid, 0.1 parts of 4-hydroxybutyl acrylate, 0.1 parts of 2,2'-azobisisobutyronitrile as a polymerization initiator, and 200 parts of ethyl acetate. Nitrogen gas was introduced to replace the air, while the mixture was gently stirred, and then a polymerization reaction was performed for 6 hours, while the temperature of the liquid in the flask was kept at about 60° C., so that a solution of an acrylic polymer was prepared. The acrylic polymer had a weight average molecular weight of 2,050,000.

Production Examples 2 to 14 and Comparative Production Examples 1 to 7

Acrylic polymer solutions were prepared using the process of Production Example 1, except that at least one of the type and amount of the monomer components was changed as shown in Table 2 and that toluene was used as the solvent in place of ethyl acetate in Production Example 14. The weight average molecular weight of the acrylic polymer obtained in each example is shown in Table 2.

Example 1

Production of Pressure-Sensitive Adhesive Layer-Carrying Polarizing Plate

Based on 100 parts of the solids of the acrylic polymer solution obtained in Production Example 1, 0.3 parts of substituted benzoyl peroxide (NYPER BMT40 manufactured by NOF CORPORATION) serving as a crosslinking agent, 0.2 parts of trimethylolpropane-tolylene diisocyanate (Coronate L manufactured by Nippon Polyurethane Industry Co., Ltd.) also serving as a crosslinking agent, and 0.1 parts of a silane coupling agent (KBM573 manufactured by Shin-Etsu Chemical Co., Ltd.) were added to the acrylic polymer solution so that an acrylic pressure-sensitive adhesive solution was prepared.

The acrylic pressure-sensitive adhesive solution was then applied to one side of a silicone-treated polyethylene terephthalate (PET) film (MRF38 manufactured by Mitsubishi Polyester Film Corp.) serving as a separator such that the pressure-sensitive adhesive layer would have a thickness of 20 μm after drying. The acrylic pressure-sensitive adhesive solution was then dried at 155° C. for 3 minutes (180 seconds) to form a pressure-sensitive adhesive layer. The pressure-sensitive adhesive layer was placed on and transferred to the polarizing plate so that a pressure-sensitive adhesive layer-carrying polarizing plate was prepared.

Examples 2 to 15 and Comparative Examples 1 to 8

Pressure-sensitive adhesive layer-carrying polarizing plates were prepared using the process of Example 1, except that the type of the acrylic polymer solution, the type or amount of the crosslinking agent, or the type or amount of the silane coupling agent for the preparation of the acrylic pressure-sensitive adhesive solution was changed as shown in Table 3 and that in Comparative Example 7, 15 parts of an acrylic oligomer (ARFONUP-1000 with a weight average molecular weight of 3,000, manufactured by Toagosei Co., Ltd.) was added together with the crosslinking agent and the silane coupling agent in the process of preparing the acrylic pressure-sensitive adhesive solution.

Production Examples 15 to 22 and Comparative Production Examples 8 to 11

Production of Acrylic Polymers

Acrylic polymer solutions were prepared using the process of Production Example 1, except that at least one of the type and amount of the monomer components was changed as shown in Table 2. The weight average molecular weight of the acrylic polymer obtained in each example is shown in Table 2.

Example 16

Production of Pressure-Sensitive Adhesive Layer-Carrying Polarizing Plate

Based on 100 parts of the solids of the acrylic polymer solution obtained in Production Example 15, 0.3 parts of substituted benzoyl peroxide (NYPER BMT40 manufactured by NOF CORPORATION) serving as a crosslinking agent, 0.1 parts of trimethylolpropane-tolylene diisocyanate (Coronate L manufactured by Nippon Polyurethane Industry Co., Ltd.) also serving as a crosslinking agent, and 0.1 parts of a silane coupling agent (KBM403 manufactured by Shin-Etsu Chemical Co., Ltd.) were added to the acrylic polymer solution so that an acrylic pressure-sensitive adhesive solution was prepared.

The acrylic pressure-sensitive adhesive solution was then applied to one side of a silicone-treated polyethylene terephthalate (PET) film (MRF38 manufactured by Mitsubishi Polyester Film Corp.) such that the pressure-sensitive adhesive layer would have a thickness of 25 μm after drying. The acrylic pressure-sensitive adhesive solution was then dried at 100° C. for 80 seconds to form a pressure-sensitive adhesive layer. The pressure-sensitive adhesive layer was placed on and transferred to the polarizing plate so that a pressure-sensitive adhesive layer-carrying polarizing plate was prepared.

Examples 17 to 28 and Comparative Examples 9 to 19

Pressure-sensitive adhesive layer-carrying polarizing plates were prepared using the process of Example 1, except that the type of the acrylic polymer solution, the type or amount of the crosslinking agent, or the amount of the silane coupling agent for the preparation of the acrylic pressure-sensitive adhesive solution, or the drying conditions (temperature and time) were changed as shown in Table 3.

The separator attached pressure-sensitive adhesive layer-carrying polarizing plate (sample) obtained in each of the examples and the comparative examples were evaluated as described below. The results of the evaluation are shown in Tables 4 and 5.

<Measurement of Initial Adhesive Strength>

The sample was cut into 25 mm-wide pieces. After the separator was peeled off, each sample piece was then press-bonded to a 0.7 mm-thick non-alkali glass plate (1737 manufactured by Corning Incorporated) by one reciprocation of a 2 kg roller. Thereafter, the sample piece was autoclaved at 50° C. and 0.5 Mpa for 15 minutes and then aged at 23° C. for 1 hour. The sample piece was peeled from the glass plate at a peel angle of 180° and a peel rate of 300 mm/minute with a tensile tester, when the adhesive strength (N/25 mm) was measured.

<Measurement of Adhesive Strength After Aging at 60° C. for 48 Hours>

The sample was cut into 25 mm-wide pieces. After the separator was peeled off, each sample piece was then press-bonded to a 0.7 mm-thick non-alkali glass plate (1737 manufactured by Corning Incorporated) by one reciprocation of a 2 kg roller. Thereafter, the sample piece was autoclaved at 50° C. and 0.5 Mpa for 15 minutes and then aged at 60° C. for 48 hours. The sample piece was peeled from the glass plate at a peel angle of 180° and a peel rate of 300 mm/minute with a tensile tester, when the adhesive strength (N/25 mm) was measured.

<Reworkability>

The sample was cut into 25 mm-wide pieces. After the separator was peeled off, each sample piece was then press-bonded to a 0.7 mm-thick non-alkali glass plate (1737 manufactured by Corning Incorporated) by one reciprocation of a 2 kg roller. The sample piece was then aged at 23° C. for 1 hour. The sample piece was peeled from the glass plate at a peel angle of 180° and a peel rate of 300 mm/minute with a tensile tester, when the adhesive strength (N/25 mm) was measured and the state of the glass surface was visually evaluated according to the following criteria.

⊙: peelable with no adhesive residue (adhesive strength: less than 10 N/25 mm);

○: peelable with no adhesive residue but with slightly high strength (adhesive strength: 10 N/25 mm or more and less than 15 N/25 mm);

Δ: peelable with no adhesive residue but with high strength (adhesive strength: 15 N/25 mm or more);
x: adhesive slightly remaining;
xx: adhesive significantly remaining.

<Durability>

The sample was cut into a 320 mm×240 mm piece. After the separator was peeled off, the sample piece was attached to a 0.7 mm-thick non-alkali glass plate (1737 manufactured by Corning Incorporated) and autoclaved at 50° C. and 0.5 Mpa for 15 minutes so that the sample piece was completely adhered to the non-alkali glass plate. After this process, the sample piece was stored for 500 hours at 80° C., 90° C., 100° C., 60° C./90% RH, or 60° C./95% RH, and then foaming, peeling or separation was visually evaluated according to the following criteria.

⊚: Neither foaming nor peeling was observed;
○: Foaming (with a maximum size of less than 100 μm) was observed with no effect on visibility;
x: Foaming (with a maximum size of 100 μm or more) or peeling was observed.

<Gel Fraction>

The pressure-sensitive adhesive composition of each example before the preparation of the sample was applied to a silicone-treated polyethylene terephthalate film such that the thickness would be the same as in each example after drying (20 μm or 25 μm). Each coating was then cured under the same conditions (temperature and time) as in each example to form a pressure-sensitive adhesive layer. After allowed to stand at a temperature of 23° C. and a humidity of 65% RH for 1 hour, the pressure-sensitive adhesive layer was measured for gel fraction. The gel fraction was determined as described below. About 0.2 g of the pressure-sensitive adhesive layer was taken and wrapped in a fluororesin (TEMISHNTF-1122, manufactured by Nitto Denko Corporation) whose weight (Wa) was measured in advance. After the fluororesin was bound such that the pressure-sensitive adhesive layer did not leak, the weight (Wb) of the wrapped product was measured. The wrapped product was immersed in about 40 ml of ethyl acetate at 23° C. for 7 days so that soluble materials were extracted. The fluororesin-wrapped pressure-sensitive adhesive layer was taken out, placed on an aluminum cup and dried at 130° C. for 2 hours, and then the weight (Wc) of the fluororesin-wrapped pressure-sensitive adhesive layer, from which the soluble materials had been removed, was measured. The gel fraction (% by weight) of the pressure-sensitive adhesive layer was calculated from these measurements according to the following formula: gel fraction (% by weight)={(Wc−Wa)/(Wb−Wa)}×100

<Coating Productivity>

Evaluation scores A, B and C were determined for the gel fraction, the drying time and the drying temperature, respectively, according to Table 1, and the product A×B×C was evaluated according to the following criteria:

○: The product of the evaluation scores is 20 or more;
Δ: The product of the evaluation scores is from 5 or more to 19 or less;
x: The product of the evaluation scores is 4 or less.

TABLE 1

| Evaluation Score | Gel Fraction A (wt %) | Drying Time B (seconds) | Drying Temperature C (° C.) |
|---|---|---|---|
| 6 | 90 to 95 | — | — |
| 5 | 80 to less than 90 | 30 | — |
| 4 | 70 to less than 80 | 45 | — |
| 3 | 60 to less than 70 | 80 | 80 or less |
| 2 | 50 to less than 60 | 120 | more than 80 to 120 or less |
| 1 | less than 50 | 180 | more than 120 to 160 or less |

<Processability>

Within 24 hours after the sample was prepared, 100 square pieces each with a side of 270 mm were obtained from the sample by punching. The operator evaluated the 100 pieces by visual observation and by touching with the hand with respect to whether or not the side of the polarizing plate had a sticky feeling or whether or not the surface of the polarizing plate was stained with the pressure-sensitive adhesive. How many pieces had a sticky feeling or a stain was determined, and evaluation was performed according to the following criteria ○: None of the 100 pieces had a sticky feeling or a stain;
Δ: One to five of the 100 pieces had a sticky feeling or a stain;
x: Six or more of the 100 pieces had a sticky feeling or a stain.

<Peeling Strength for Separator>

The sample was cut into a 100 mm-long, 50 mm-wide piece. The separator was then peeled from the sample piece at a peel angle of 180° and a peel rate of 300 mm/minute with a tensile tester, when the peeling strength (N/50 mm) was measured. The peeling strength is preferably from 0.05 to 0.1 N/50 mm, more preferably from 0.05 to 0.09 N/50 mm. If the peeling strength is less than 0.05 N/50 mm, a failure such as partial separation of the separator from the pressure-sensitive adhesive layer of a pressure-sensitive adhesive optical film can easily occur during working processes. If the peeling strength is more than 0.1 N/50 mm, it can be difficult for panel makers to easily peel the separator from the pressure-sensitive adhesive layer of a pressure-sensitive adhesive optical film, which can reduce the productivity.

<Peeling Workability of the Separator>

The separator was peeled from each of 100 sample pieces with an automatic peeling machine (manufactured by Nitto Denko Corporation), and the peeling was observed and evaluated according to the following criteria.

○: None of the 100 pieces failed peeling;
x: One or more of the 100 pieces failed peeling.

TABLE 2

| | Monomer Components | | | | | | | | | |
|---|---|---|---|---|---|---|---|---|---|---|
| | Alkyl (Meth)acrylate | Tertiary Amino Group-Containing Monomer | | Nitrogen-Containing Monomer Other Than the Tertiary Amino Group-Containing Monomer | | Carboxyl Group-Containing Monomer | Hydroxyl Group-Containing Monomer | | Additional Monomer | Weight Average |
| | BA (parts) | DMAEA (parts) | DMAPAA (parts) | ACMO (parts) | AAM (parts) | AA (parts) | 4HBA (parts) | 2HEA (parts) | PEA (parts) | Molecular Weight (×10$^4$) |
| Production Example 1 | 99.7 | 0.1 | — | — | — | 0.1 | 0.1 | — | — | 205 |
| Production Example 2 | 99.1 | 0.3 | — | — | — | 0.3 | 0.3 | — | — | 180 |
| Production Example 3 | 98.55 | 0.45 | — | — | — | 0.5 | 0.5 | — | — | 193 |
| Production Example 4 | 99.7 | — | 0.1 | — | — | 0.1 | 0.1 | — | — | 200 |
| Production Example 5 | 99.1 | — | 0.3 | — | — | 0.3 | 0.3 | — | — | 198 |
| Production Example 6 | 98.65 | — | 0.45 | — | — | 0.45 | 0.45 | — | — | 188 |
| Production Example 7 | 99.4 | 0.3 | — | — | — | 0.3 | — | — | — | 195 |
| Production Example 8 | 99.4 | 0.3 | — | — | — | — | 0.3 | — | — | 210 |
| Production Example 9 | 99.7 | 0.3 | — | — | — | — | — | — | — | 179 |
| Production Example 10 | 99.1 | 0.3 | — | — | — | 0.3 | — | 0.3 | — | 183 |
| Production Example 11 | 69.1 | 0.3 | — | — | — | 0.3 | 0.3 | — | 30 | 177 |
| Production Example 12 | 97.9 | 1.5 | — | — | — | 0.3 | 0.3 | — | — | 176 |
| Production Example 13 | 95.5 | 1.5 | — | — | — | 1.5 | 1.5 | — | — | 181 |
| Production Example 14 | 99.1 | 0.3 | — | — | — | 0.3 | 0.3 | — | — | 100 |
| Comparative Production Example 1 | 98.65 | — | — | 0.45 | — | 0.45 | 0.45 | — | — | 194 |
| Comparative Production Example 2 | 99 | — | — | — | — | — | 1 | — | — | 184 |
| Comparative Production Example 3 | 99.4 | — | — | — | — | 0.3 | 0.3 | — | — | 194 |
| Comparative Production Example 4 | 94.4 | 5 | — | — | — | 0.3 | 0.3 | — | — | 182 |
| Comparative Production Example 5 | 97 | — | — | — | 2.5 | — | 0.5 | — | — | 120 |
| Comparative Production Example 6 | 92 | — | — | 5 | — | 2.9 | — | 0.1 | — | 178 |
| Comparative Production Example 7 | 99 | — | — | — | — | 1 | — | — | — | 193 |
| Production Example 15 | 98.95 | 0.05 | — | — | — | — | 1 | — | — | 205 |
| Production Example 16 | 98.9 | 0.1 | — | — | — | — | 1 | — | — | 210 |
| Production Example 17 | 98.5 | 0.5 | — | — | — | — | 1 | — | — | 189 |
| Production Example 18 | 98 | 1 | — | — | — | — | 1 | — | — | 203 |
| Production Example 19 | 98.95 | — | 0.05 | — | — | — | 1 | — | — | 221 |
| Production Example 20 | 98.9 | — | 0.1 | — | — | — | 1 | — | — | 181 |
| Production Example 21 | 98.8 | — | 0.2 | — | — | — | 1 | — | — | 192 |
| Production Example 22 | 94.9 | 0.1 | — | — | — | 5 | — | 0.1 | — | 211 |
| Comparative Production Example 8 | 99 | — | — | — | — | — | 1 | — | — | 184 |

TABLE 2-continued

| | Monomer Components | | | | | | | | | |
|---|---|---|---|---|---|---|---|---|---|---|
| | Alkyl (Meth)acrylate | Tertiary Amino Group-Containing Monomer | | Nitrogen-Containing Monomer Other Than the Tertiary Amino Group-Containing Monomer | | Carboxyl Group-Containing Monomer | Hydroxyl Group-Containing Monomer | | Additional Monomer | Weight Average |
| | BA (parts) | DMAEA (parts) | DMAPAA (parts) | ACMO (parts) | AAM (parts) | AA (parts) | 4HBA (parts) | 2HEA (parts) | PEA (parts) | Molecular Weight (×10⁴) |
| Comparative Production Example 9 | 98.9 | — | — | 0.1 | — | — | 1 | — | — | 214 |
| Comparative Production Example 10 | 98 | — | — | 1 | — | — | 1 | — | — | 226 |
| Comparative Production Example 11 | 94.9 | — | — | — | — | 5 | — | 0.1 | — | 206 |

In Table 2, BA represents butyl acrylate, DMAEA N,N-dimethylaminoethyl acrylate, DMAPAA N,N-dimethylaminopropylacrylamide, ACMO N-acryloylmorpholine, AAM acrylamide, AA acrylic acid, 4HBA 4-hydroxybutyl acrylate, 2HEA 2-hydroxyethyl acrylate, and PEA phenoxyethyl acrylate.

TABLE 3

| | | | Crosslinking Agents | | | | | | Drying Conditions | |
|---|---|---|---|---|---|---|---|---|---|---|
| | | | Amount of Isocyanate Crosslinking Agent (parts) | | Silane Coupling Agent | | | | | |
| | Type of Acrylic Polymer | Peroxide | *01 (parts) | *02 (parts) | *11 (parts) | *12 (parts) | *13 (parts) | Additional Component | Temperature (° C.) | Time (seconds) |
| Example 1 | Production Example 1 | 0.3 | 0.2 | — | 0.1 | — | — | — | 155 | 180 |
| Example 2 | Production Example 2 | 0.3 | 0.2 | — | 0.1 | — | — | — | 155 | 180 |
| Example 3 | Production Example 3 | 0.3 | 0.2 | — | 0.1 | — | — | — | 155 | 180 |
| Example 4 | Production Example 4 | 0.3 | 0.2 | — | 0.1 | — | — | — | 155 | 180 |
| Example 5 | Production Example 5 | 0.3 | 0.2 | — | 0.1 | — | — | — | 155 | 180 |
| Example 6 | Production Example 6 | 0.3 | 0.2 | — | 0.1 | — | — | — | 155 | 180 |
| Example 7 | Production Example 7 | 0.3 | 0.2 | — | 0.1 | — | — | — | 155 | 180 |
| Example 8 | Production Example 8 | 0.3 | 0.2 | — | 0.1 | — | — | — | 155 | 180 |
| Example 9 | Production Example 9 | 0.3 | 0.2 | — | 0.1 | — | — | — | 155 | 180 |
| Example 10 | Production Example 10 | 0.3 | 0.2 | — | 0.1 | — | — | — | 155 | 180 |
| Example 11 | Production Example 11 | 0.3 | 0.2 | — | 0.1 | — | — | — | 155 | 180 |
| Example 12 | Production Example 1 | 0.3 | 0.2 | — | — | 0.1 | — | — | 155 | 180 |
| Example 13 | Production Example 12 | 0.3 | 0.2 | — | 0.1 | — | — | — | 155 | 180 |
| Example 14 | Production Example 13 | 0.3 | 0.2 | — | 0.1 | — | — | — | 155 | 180 |
| Example 15 | Production Example 14 | 0.3 | 0.2 | — | 0.1 | — | — | — | 155 | 180 |
| Comparative Example 1 | Comparative Production Example 1 | 0.3 | 0.2 | — | 0.1 | — | — | — | 155 | 180 |
| Comparative Example 2 | Comparative Production Example 2 | 0.3 | — | 0.2 | — | — | 0.1 | — | 155 | 180 |
| Comparative Example 3 | Comparative Production Example 3 | 0.3 | 0.2 | — | 0.1 | — | — | — | 155 | 180 |

TABLE 3-continued

| | | | Crosslinking Agents | | | | | | | |
|---|---|---|---|---|---|---|---|---|---|---|
| | | | | Amount of Isocyanate Crosslinking Agent (parts) | | Silane Coupling Agent | | | | Drying Conditions |
| | Type of Acrylic Polymer | Peroxide | *01 (parts) | *02 (parts) | *11 (parts) | *12 (parts) | *13 (parts) | Additional Component | Temperature (° C.) | Time (seconds) |
| Comparative Example 4 | Comparative Production Example 4 | 0.3 | 0.2 | — | 0.1 | — | — | — | 155 | 180 |
| Comparative Example 5 | Comparative Production Example 5 | — | 0.2 | — | 0.1 | — | — | — | 155 | 180 |
| Comparative Example 6 | Comparative Production Example 6 | 0.15 | 0.6 | — | — | 0.1 | — | — | 155 | 180 |
| Comparative Example 7 | Comparative Production Example 7 | — | 0.2 | — | 0.1 | — | — | *Oligomer | 155 | 180 |
| Comparative Example 8 | Production Example 2 | — | 0.2 | — | 0.1 | — | — | — | 155 | 180 |
| Example 16 | Production Example 15 | 0.3 | 0.1 | — | — | 0.2 | — | — | 100 | 80 |
| Example 17 | Production Example 16 | 0.3 | 0.1 | — | — | 0.2 | — | — | 80 | 100 |
| Example 18 | Production Example 16 | 0.3 | 0.1 | — | — | 0.2 | — | — | 100 | 80 |
| Example 19 | Production Example 16 | 0.3 | 0.1 | — | — | 0.2 | — | — | 120 | 45 |
| Example 20 | Production Example 16 | 0.3 | 0.1 | — | — | 0.2 | — | — | 155 | 30 |
| Example 21 | Production Example 16 | 0.1 | 0.1 | — | — | 0.2 | — | — | 100 | 80 |
| Example 22 | Production Example 16 | 0.5 | 0.1 | — | — | 0.2 | — | — | 100 | 80 |
| Example 23 | Production Example 17 | 0.3 | 0.1 | — | — | 0.2 | — | — | 100 | 80 |
| Example 24 | Production Example 18 | 0.3 | 0.1 | — | — | 0.2 | — | — | 100 | 80 |
| Example 25 | Production Example 19 | 0.3 | 0.1 | — | — | 0.2 | — | — | 100 | 80 |
| Example 26 | Production Example 20 | 0.3 | 0.1 | — | — | 0.2 | — | — | 100 | 80 |
| Example 27 | Production Example 21 | 0.3 | 0.1 | — | — | 0.2 | — | — | 100 | 80 |
| Example 28 | Production Example 22 | 0.2 | — | — | — | 0.08 | — | — | 100 | 80 |
| Comparative Example 9 | Comparative Production Example 8 | 0.3 | 0.1 | — | — | 0.2 | — | — | 100 | 80 |
| Comparative Example 10 | Comparative Production Example 8 | 0.3 | 0.1 | — | — | 0.2 | — | — | 155 | 30 |
| Comparative Example 11 | Comparative Production Example 8 | 0.3 | 0.1 | — | — | 0.2 | — | — | 155 | 80 |
| Comparative Example 12 | Comparative Production Example 8 | 0.1 | 0.1 | — | — | 0.2 | — | — | 155 | 80 |
| Comparative Example 13 | Comparative Production Example 8 | 0.5 | 0.1 | — | — | 0.2 | — | — | 100 | 80 |
| Comparative Example 14 | Comparative Production Example 9 | 0.3 | 0.1 | — | — | 0.2 | — | — | 100 | 80 |
| Comparative Example 15 | Comparative Production Example 9 | 0.3 | 0.1 | — | — | 0.2 | — | — | 155 | 30 |
| Comparative Example 16 | Comparative Production Example 9 | 0.3 | 0.1 | — | — | 0.2 | — | — | 155 | 80 |
| Comparative Example 17 | Comparative Production Example 10 | 0.3 | 0.1 | — | — | 0.2 | — | — | 100 | 80 |
| Comparative Example 18 | Comparative Production Example 11 | 0.2 | — | — | — | 0.08 | — | — | 140 | 180 |

TABLE 3-continued

| | | | Crosslinking Agents | | Silane Coupling Agent | | | | Drying Conditions | |
|---|---|---|---|---|---|---|---|---|---|---|
| | Type of Acrylic Polymer | Peroxide | Amount of Isocyanate Crosslinking Agent (parts) | | | | | Additional Component | Temperature (°C.) | Time (seconds) |
| | | | *01 (parts) | *02 (parts) | *11 (parts) | *12 (parts) | *13 (parts) | | | |
| Comparative Example 19 | Comparative Production Example 11 | 0.15 | 0.6 | — | — | 0.1 | — | — | 150 | 120 |

In Table 3, the peroxide is substituted benzoyl peroxide (NYPER BMT40 manufactured by NOF CORPORATION) in all the cases. Concerning the isocyanate crosslinking agent, *01 represents trimethylolpropane-tolylene diisocyanate (Coronate L manufactured by Nippon Polyurethane Industry Co., Ltd.), and *02 trimethylolpropane-xylene diisocyanate (TAKENATE D-110N manufactured by Mitsui Takeda Chemicals, Inc.). Concerning the silane coupling agent, *11 represents KBM573 manufactured by Shin-Etsu Chemical Co., Ltd., *12 KBM403 manufactured by Shin-Etsu Chemical Co., Ltd., and *13 A-100 manufactured by Soken Chemical & Engineering Co., Ltd. In Comparative Example 7, the other additive represented by *oligomer is an acrylic oligomer (ARFONUP-1000 with a weight average molecular weight of 3,000, manufactured by Toagosei Co., Ltd.

TABLE 4

| | Evaluations | | | | | | | | | | |
|---|---|---|---|---|---|---|---|---|---|---|---|
| | Adhesive Strength (N/25 mm) | | Reworkability | Durability | | | | | Processability | Workability Peeling | |
| | Initial | After 60° C./48 Hours | Degree of Adhesive Remaining | 80° C. | 90° C. | 100° C. | 60° C./ 90% RH | 60° C./ 95% RH | Gel Fraction (wt %) | Degree of Adhesive Dropout | Strength for Separator (N/50 mm) | Peeling Workability |
| Example 1 | 3.5 | 5.5 | ⊙ | ⊙ | ⊙ | ⊙ | ⊙ | ⊙ | ⊙ | 86 | ○ | 0.06 | ○ |
| Example 2 | 4.1 | 6.7 | ⊙ | ⊙ | ⊙ | ⊙ | ⊙ | ⊙ | 91 | ○ | 0.07 | ○ |
| Example 3 | 4.9 | 8.5 | ⊙ | ⊙ | ⊙ | ⊙ | ⊙ | ⊙ | 89 | ○ | 0.06 | ○ |
| Example 4 | 3.8 | 5.6 | ⊙ | ⊙ | ⊙ | ⊙ | ⊙ | ⊙ | 92 | ○ | 0.08 | ○ |
| Example 5 | 4.9 | 6.0 | ⊙ | ⊙ | ⊙ | ⊙ | ⊙ | ⊙ | 91 | ○ | 0.06 | ○ |
| Example 6 | 5.2 | 8.9 | ⊙ | ⊙ | ⊙ | ⊙ | ⊙ | ⊙ | 90 | ○ | 0.07 | ○ |
| Example 7 | 5.5 | 11.6 | ○ | ⊙ | ⊙ | ○ | ⊙ | ⊙ | 89 | ○ | 0.07 | ○ |
| Example 8 | 5.1 | 13.7 | ○ | ⊙ | ○ | ○ | ⊙ | ⊙ | 89 | ○ | 0.08 | ○ |
| Example 9 | 4.8 | 10.2 | ○ | ○ | ○ | ○ | ⊙ | ⊙ | 92 | ○ | 0.08 | ○ |
| Example 10 | 4.9 | 9.8 | ⊙ | ⊙ | ⊙ | ○ | ⊙ | ⊙ | 89 | ○ | 0.07 | ○ |
| Example 11 | 5.6 | 9.9 | ⊙ | ⊙ | ⊙ | ⊙ | ⊙ | ⊙ | 88 | ○ | 0.09 | ○ |
| Example 12 | 4.0 | 5.7 | ⊙ | ⊙ | ⊙ | ⊙ | ⊙ | ⊙ | 87 | ○ | 0.06 | ○ |
| Example 13 | 9.9 | 14.5 | ○ | ⊙ | ⊙ | ⊙ | ⊙ | ⊙ | 90 | ○ | 0.07 | ○ |
| Example 14 | 9.8 | 13.3 | ○ | ⊙ | ⊙ | ⊙ | ⊙ | ⊙ | 92 | ○ | 0.08 | ○ |
| Example 15 | 8.9 | 14.1 | ○ | ○ | ⊙ | ⊙ | ⊙ | ⊙ | 91 | ○ | 0.09 | ○ |
| Comparative Example 1 | 8.4 | 15.9 | Δ | ⊙ | ⊙ | ⊙ | ⊙ | ⊙ | 65 | ○ | 0.16 | X |
| Comparative Example 2 | 8.2 | 25.9 | XX | ⊙ | X | X | ⊙ | ⊙ | 55 | Δ | 0.15 | X |
| Comparative Example 3 | 8.9 | 20.4 | Δ | ○ | X | X | ○ | ○ | 53 | Δ | 0.17 | X |
| Comparative Example 4 | 11.2 | 28.4 | X | ⊙ | ⊙ | ⊙ | ⊙ | ⊙ | 81 | ○ | 0.15 | X |
| Comparative Example 5 | 10.4 | 19.8 | Δ | ⊙ | ○ | ○ | ○ | ○ | 23 | X | 0.08 | ○ |
| Comparative Example 6 | 13.2 | 25.1 | X | ⊙ | ⊙ | ⊙ | ⊙ | ⊙ | 68 | ○ | 0.12 | X |
| Comparative Example 7 | 5.4 | 12.1 | X | ○ | ○ | X | ○ | X | 21 | X | 0.07 | ○ |
| Comparative Example 8 | 5.1 | 19.3 | Δ | ⊙ | ⊙ | ○ | ⊙ | ⊙ | 28 | X | 0.09 | ○ |

TABLE 5

| | Adhesive Strength (N/25 mm) | | Rework-ability | Durability | | | | | Gel Fraction (wt %) | Process-ability Coating Productivity | Workability | | Peeling Workability |
|---|---|---|---|---|---|---|---|---|---|---|---|---|---|
| | Initial | After 60° C./48 Hours | Degree of Adhesive Remaining | 80° C. | 90° C. | 100° C. | 60° C./90% RH | 60° C./95% RH | | | Degree of Adhesive Dropout | Peeling Strength for Separator (N/50 mm) | |
| Example 16 | 5.2 | 10.1 | ○ | ◉ | ◉ | ◉ | ◉ | ◉ | 85 | ○ | ○ | 0.07 | ○ |
| Example 17 | 5.6 | 10.2 | ○ | ◉ | ◉ | ◉ | ◉ | ◉ | 83 | ○ | ○ | 0.08 | ○ |
| Example 18 | 5.5 | 10.8 | ○ | ◉ | ◉ | ◉ | ◉ | ◉ | 94 | ○ | ○ | 0.06 | ○ |
| Example 19 | 5.4 | 11.0 | ○ | ◉ | ◉ | ◉ | ◉ | ◉ | 91 | ○ | ○ | 0.07 | ○ |
| Example 20 | 5.3 | 10.9 | ○ | ◉ | ◉ | ◉ | ◉ | ◉ | 89 | ○ | ○ | 0.08 | ○ |
| Example 21 | 5.2 | 11.3 | ○ | ◉ | ◉ | ◉ | ◉ | ◉ | 77 | ○ | ○ | 0.06 | ○ |
| Example 22 | 5.2 | 10.1 | ○ | ◉ | ◉ | ◉ | ◉ | ◉ | 94 | ○ | ○ | 0.09 | ○ |
| Example 23 | 5.3 | 10.5 | ○ | ◉ | ◉ | ◉ | ◉ | ◉ | 81 | ○ | ○ | 0.07 | ○ |
| Example 24 | 7.8 | 15.1 | Δ | ◉ | ◉ | ◉ | ◉ | ◉ | 84 | ○ | ○ | 0.06 | ○ |
| Example 25 | 5.1 | 12.1 | ○ | ◉ | ◉ | ◉ | ◉ | ◉ | 78 | ○ | ○ | 0.07 | ○ |
| Example 26 | 5.4 | 12.3 | ○ | ◉ | ◉ | ◉ | ◉ | ◉ | 80 | ○ | ○ | 0.07 | ○ |
| Example 27 | 5.1 | 13.1 | ○ | ◉ | ◉ | ◉ | ◉ | ◉ | 83 | ○ | ○ | 0.08 | ○ |
| Example 28 | 5.6 | 14.8 | ○ | ◉ | ◉ | ◉ | ◉ | ◉ | 81 | ○ | ○ | 0.08 | ○ |
| Comparative Example 9 | 8.1 | 20.1 | XX | ◉ | X | X | ◉ | ◉ | 18 | Δ | X | 0.05 | ○ |
| Comparative Example 10 | 7.9 | 22.3 | XX | ◉ | X | X | ◉ | ◉ | 31 | Δ | X | 0.09 | ○ |
| Comparative Example 11 | 7.8 | 21.5 | XX | ◉ | X | X | ◉ | ◉ | 87 | Δ | ○ | 0.15 | X |
| Comparative Example 12 | 8.2 | 23.6 | XX | ◉ | X | X | ◉ | ◉ | 46 | X | X | 0.08 | ○ |
| Comparative Example 13 | 7.6 | 24.1 | XX | ◉ | X | X | ◉ | ◉ | 33 | Δ | X | 0.12 | X |
| Comparative Example 14 | 7.5 | 18.2 | X | ◉ | ○ | X | ◉ | ◉ | 28 | Δ | X | 0.07 | ○ |
| Comparative Example 15 | 8.1 | 16.6 | X | ◉ | ○ | ○ | ◉ | ◉ | 24 | Δ | X | 0.08 | ○ |
| Comparative Example 16 | 6.9 | 18.3 | X | ◉ | ○ | ○ | ◉ | ◉ | 84 | Δ | ○ | 0.16 | X |
| Comparative Example 17 | 9.8 | 20.2 | X | ◉ | ◉ | ◉ | ◉ | ◉ | 21 | Δ | X | 0.07 | ○ |
| Comparative Example 18 | 10.5 | 22.1 | XX | ◉ | ◉ | ◉ | ◉ | ◉ | 75 | X | ○ | 0.16 | X |
| Comparative Example 19 | 11.2 | 23.4 | XX | ◉ | ◉ | ◉ | ◉ | ◉ | 81 | Δ | ○ | 0.25 | X |

Tables 4 and 5 show that the pressure-sensitive adhesive layer formed from the pressure-sensitive adhesive composition for an optical film of the present invention provides satisfactory reworkability, durability and processability and shows easy peelability and good workability with respect to the separator. As is apparent from the coating productivity in Table 5, the pressure-sensitive adhesive layer with the specific gel fraction can be obtained under low-temperature, short-time drying conditions. The coating productivity evaluation score (not specifically shown in Table 4) for the examples listed in Table 4 is 5 or 6, which is evaluated as "Δ".

What is claimed is:

1. A pressure-sensitive adhesive layer, comprising a product formed from a pressure-sensitive adhesive composition, wherein
the pressure-sensitive adhesive composition comprises:
100 parts by weight of a (meth)acrylic polymer having a weight average molecular weight of 1,800,000 to 3,000,000 and comprising 90 to 99.99% by weight of an alkyl (meth)acrylate monomer unit and 0.01 to 2% by weight of a tertiary amino group-containing (meth)acrylate monomer unit selected from the group consisting of N,N-dimethylaminoethyl (meth)acrylate and N,N-dimethylaminopropylacrylamide; and 0.01 to 2 parts by weight of a peroxide as a crosslinking agent,
wherein the pressure-sensitive adhesive layer has a gel fraction of 50 to 95% by weight, and the pressure-sensitive adhesive layer has a peeling strength from 0.05 to 0.1 N/50 mm;
the pressure-sensitive adhesive composition further comprises 0.01 to 2 parts by weight of an isocyanate crosslinking agent as another crosslinking agent, based on 100 parts by weight of the (meth)acrylic polymer;
the pressure-sensitive adhesive composition further comprises 0.01 to 2 parts by weight of a silane coupling agent, based on 100 parts by weight of the (meth)acrylic polymer; and
the (meth)acrylic polymer further comprises 0.01 to 5% by weight of a carboxyl group-containing monomer unit and/or 0.01 to 5% by weight of a hydroxyl group-containing monomer unit.

2. A pressure-sensitive adhesive optical film, comprising an optical film; and
the pressure-sensitive adhesive layer according to claim 1 formed on at least one side of the optical film.

3. An image display, comprising at least one piece of the pressure-sensitive adhesive optical film of claim 2.

4. The pressure-sensitive adhesive layer according to claim 1, wherein the tertiary amino group-containing (meth)acrylate monomer is N,N-dialkylaminoalkyl (meth)acrylate.

* * * * *